(12) United States Patent
Arab et al.

(10) Patent No.: US 12,224,701 B2
(45) Date of Patent: *Feb. 11, 2025

(54) DUAL AXIS SOLAR ARRAY TRACKER

(71) Applicant: MAXUN Solar Inc., Ottawa (CA)

(72) Inventors: Ra'ed Arab, Ottawa (CA); Bruno Rocha, Ottawa (CA); Abdullah Arab, Ottawa (CA)

(73) Assignee: MAXUN Solar Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,300

(22) Filed: Oct. 31, 2023

(65) Prior Publication Data
US 2024/0063750 A1   Feb. 22, 2024

Related U.S. Application Data

(63) Continuation of application No. 18/006,615, filed as application No. PCT/CA2022/050049 on Jan. 13, 2022.

(60) Provisional application No. 63/137,221, filed on Jan. 14, 2021.

(51) Int. Cl.
| | |
|---|---|
| H02S 20/32 | (2014.01) |
| F24S 30/455 | (2018.01) |
| H02K 7/116 | (2006.01) |
| H02S 40/44 | (2014.01) |
| F24S 30/00 | (2018.01) |

(52) U.S. Cl.
CPC ............ *H02S 20/32* (2014.12); *F24S 30/455* (2018.05); *H02K 7/1166* (2013.01); *H02S 40/44* (2014.12); *F24S 2030/135* (2018.05); *F24S 2030/136* (2018.05)

(58) Field of Classification Search
CPC ....... H01L 31/00–078; H02S 10/00–40; H02S 20/00–32; H02S 40/40–44
See application file for complete search history.

(56) References Cited

U.S. PATENT DOCUMENTS 11,843,348 B2 * 12/2023 Arab ...................... H02S 40/44

FOREIGN PATENT DOCUMENTS

CN          202014208 U      10/2011

* cited by examiner

*Primary Examiner* — Bach T Dinh

(57) ABSTRACT

A dual axis solar array tracker for supporting a plurality of solar energy harvesting elements at a plurality of solar collector nodes. Two perpendicular axes of movement, specifically a rotation axis at a rotatable transverse beam and a tilt axis relative to the axis of the transverse beam, enable accurate orientation in a stable configuration. The dual axis design of the solar tracker enables the movement of solar collectors such that they can be directed towards the sun wherein incoming solar rays are perpendicular to the solar cell element of the solar collector to optimize collection of solar radiation. The present solar tracker array also enables integrated solar, electrical and/or thermal energy cogeneration.

20 Claims, 13 Drawing Sheets

DUAL AXIS SOLAR ARRAY TRACKER

CROSS-REFERENCE TO RELATED APPLICATIONS

This application is a continuation of U.S. patent application Ser. No. 18/006,615 filed on 24 Jan. 2023, which claims priority to United States provisional patent application U.S. 63/137,221 filed 14 Jan. 2021, and which is a United States National Stage application under 35 U.S.C. 371 of PCT Application No. PCT/CA2022/050049, filed on 13 Jan. 2022, all of which are hereby incorporated by reference herein in their entirety.

FIELD OF THE INVENTION

The present invention pertains to structures for solar array tracking for supporting solar energy harvesting elements or solar collector elements. The present invention also pertains to a solar voltaic and thermal energy collection and solar voltaic and thermal energy cogeneration system.

BACKGROUND

In solar energy harvesting systems, the efficiency of the system or the amount of energy harvested is maximized when solar harvesting elements are oriented towards the sun. Solar harvesting elements such as, for example, photovoltaic cells, photo-thermal cells, and related elements, such as reflective elements (mirrors, etc.) and other optical elements (lenses, etc.) can be used to harvest solar energy in the form of light and heat. One type of solar harvesting element is a solar cell, also referred to as photovoltaic cell, which is an electrical device that collects and converts the energy as light from the sun directly into electricity by the photovoltaic effect. To maximize the light collected, solar harvesting elements are generally aligned in an orientation that is roughly perpendicular with respect to incoming solar rays, and the angle or orientation of the solar cell would ideally be adjusted over time and as the sun moves relative to the solar cell location to optimally align the solar cell normal to incoming light. Solar harvesting systems not equipped with moving and tracking systems are installed with a certain fixed orientation depending on their installation location (such as latitude, etc.), to maximize the period of time that their solar elements are close to perpendicular with respect to incoming solar rays. Systems enabling sun following movement, directing and holding solar elements perpendicular to incoming solar rays, are commonly referred as solar trackers or solar array trackers. Existing trackers employ a variety of mechanisms to control the angle of the solar cell, including linkages, gears, joints, belt, cable drives, and other mechanical and electronic devices.

United States patent US20190199276 describes a single axis tracker, in which one or more solar elements are connected to an axial element around which they rotate, and a semi-circular structural member. This semi-circular member is a circular rack, having teeth (similar to a rack in a rack and pinion type of gear), which through a toothed gear system is made to rotate. This allows the solar elements to rotate and be pointed to, or be close to pointed to the sun. This is also achieved by having said system and axial elements, around which the solar elements rotate, with a certain orientation upon installation, depending on the location, possible available orientations, and latitude where the system is to be installed. However, with such a uniaxial system is not possible to have the said solar elements pointed towards the sun, or close to such required orientations always. This is not possible due to the travel of relative positions of the sun in the sky during an entire year.

Other systems use a similar configuration, in which the axial elements to which the solar elements are connected to rotate, with their motion being commanded by motorized elements. Other systems use linkages, belt, cable drives, and other mechanical devices to achieve solar tracking motion. Spanish patent application ES2404671A1 describes a scissor type of linkage system for a single axis solar tracker with optional mounting on a vertical rotation axis or a system providing a horizontal rotation axis perpendicular to the one provided by the said scissor type mechanism, providing a secondary rotation axis. In both cases a vertical structural element is used to increase the height of the system requiring reinforcement structures and thus considerably complicating the installation.

In another example, U.S. Pat. No. 9,729,102 describes a single axis solar tracking solution with a folding solar panel. The solar panel can be mounted on a system with a vertical rotation axis, forming then a dual axis tracking system. Other common tracking systems are based on at least one of the rotation axes being vertical, such as in ground-mount type of configurations. The majority of these configurations rely on a vertical structural member, or combination of two, three, or four vertical or close to vertical members, optionally with additional linkage systems, swivels, ball joints, etc.

Solar array tracking systems are usually seen in ground-mounts on horizontal surfaces and very rarely, if at all, seen on angled mounting surfaces, such as angled rooftops. These types of array systems usually rely on a limited number of fixing points, i.e., a small area for fixing them to supporting areas and/or structures, which is not feasible for installing said array systems on rooftops, walls, or slanted or uneven surfaces. In particular, loads from the system, such as weight, from winds, can only be transmitted to areas and/or structures to which these systems will be mounted to in localized regions, concentrating the intensity of such loads with resulting negative structural effects. Such arrays therefore generally require application of structural reinforcements in those areas to support added applied forces, both in the array system itself and in areas and/or structures to which these systems are mounted. This need for structural reinforcement comes with a consequent increase in weight and complexity.

Affixation of solar array trackers to walls and rooftops is ideal due to available area to install such systems, for safety reasons to keep the structures away from people, and to avoid shadowing, however, required structural reinforcements to support trackers are not always possible or realistic to apply, such as on a slanted roof or wall. Furthermore, relying on vertical or quasi-vertical structural members, the height of these type of systems can be increased substantially, which adds a comparable increase in the loads and moments being transmitted and transferred through the systems' structure and to surrounding structures in said such localized attachment regions, increasing further the need for structural reinforcements, with consequent complexity, weight and costs. The increased height also increases exposure to winds, with higher velocities and therefore inducing higher loads. Increased height means that the top of the system is pushed towards the outwards of the flow boundary layer provided by the surfaces where the system is installed to, ex. a roof. Said added vertical height has also consequences in generated shading and on safety measures. The higher the height of these systems, the more shading is created in their surrounding areas. As a consequence, the spacing between installed systems has to increase, to avoid the higher costs of having a higher number of systems having to be installed to reach a certain capacity of amount of harvested energy, with several systems being underperforming and underutilized due to being on the shade of neighbouring systems. Safety wise, spacing is also needed to avoid any damage that might occur to one system (for instance caused by high winds) from affecting neighbouring systems.

Solar cogeneration, also known as hybrid solar or simply cogeneration, combines photovoltaic (PV) cell technology and solar thermal technology in a single system to deliver both electricity and heat and maximize absorbable energy from the sun. Cogeneration is a more efficient solar energy harvesting method because otherwise-wasted heat can be harnessed and be put to productive use. There remains a need for a solar tracker that can support a plurality of solar collectors that maximizes the energy collected per area. There also remains a need for an accurate solar array tracker capable of dual axis tracking but with a small profile or height which enables distributed loading transmission to host structures, and which can be mounted on horizontal as well as non-horizontal surfaces.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a tracker that can support a plurality of solar collectors or solar energy harvesting elements and provide a robust system for controlling the angle of solar collectors to accurately track the sun.

In an aspect there is provided a dual axis solar tracker comprising: a first longitudinal beam comprising a first mechanical system; a second longitudinal beam offset from the first longitudinal beam comprising a second mechanical system; at least one transverse beam extending between the first longitudinal beam and the second longitudinal beam, the transverse beam comprising: a rotatable shaft comprising a plurality of solar collector node mating elements, the rotatable shaft having a first end comprising a first transverse beam mechanical element for engaging with a first longitudinal beam mating element on the first mechanical system to rotate the transverse beam around its axis, and a second end comprising a second transverse beam mechanical element for engaging with a second longitudinal beam mating element on the second mechanical system to tilt the plurality of solar collector nodes relative to the transverse beam; a plurality of solar collector nodes, each of the solar collector nodes comprising a collector node mechanical element engaged with one of the plurality of collector node mating elements on the rotating shaft; and a hollow cross section for receiving a conduit connecting each of the plurality of solar collector nodes.

In an embodiment, the first longitudinal beam, the second longitudinal beam, or the first longitudinal beam and the second longitudinal beam comprise a hollow cross section connecting to the conduit in the transverse beam.

In another embodiment, the conduit is selected from an electrical conduit, a fluid conduit, and an electrical conduit and a fluidic conduit.

In another embodiment, the fluid conduit fluidly connects the plurality of solar collector nodes to a thermal cogeneration system.

In another embodiment, the solar tracker further comprises a first motor connected to the first mechanical system for controlling the first mechanical system and a second motor connected to the second mechanical system for controlling the second mechanical system.

In another embodiment, the solar tracker further comprises a plurality of solar energy harvesting elements connected to the plurality of solar collector nodes.

In another embodiment, the plurality of solar collector nodes comprise photovoltaic light collection cells, thermal collection cells, combined photo-thermal cells, or a combination thereof.

In another embodiment, the conduit in the transverse beam is a fluid conduit and the plurality of solar collector nodes comprise an integrated thermal fluidic conduit connected to the fluid conduit.

In another embodiment, at least one of the first longitudinal beam and the second longitudinal beam comprises a longitudinal electrical main, and the plurality of solar collector nodes are electrically connected to the longitudinal electrical main.

In another embodiment, at least one of the first longitudinal beam and the second longitudinal beam comprises a fluid conduit main, and the plurality of solar collector nodes are fluidly connected the longitudinal fluid conduit main.

In another embodiment, the rotatable shaft on the transverse beam comprises a plurality of worm drives for engaging with worm gears on the plurality of solar collector nodes.

In another embodiment, the solar tracker further comprises a plurality of transverse beams.

In another embodiment, the solar tracker further comprises a mounting structure for raising the solar tracker relative to a mounting surface.

In another embodiment, the raised mounting structure is capable of adjusting an angle of the solar tracker array relative to a mounting surface.

In another aspect there is provided a dual axis solar tracker comprising: a first longitudinal beam comprising a first mechanical system; a second longitudinal beam offset from the first longitudinal beam comprising a second mechanical system; at least one transverse beam extending between the first longitudinal beam and the second longitudinal beam, the transverse beam comprising: a rotatable shaft comprising a plurality of solar collector node mating elements, the rotatable shaft having a first end comprising a first transverse beam mechanical element for engaging with a first longitudinal beam mating element on the first mechanical system to rotate the transverse beam around its axis, and a second end comprising a second transverse beam mechanical element for engaging with a second longitudinal beam mating element on the second mechanical system to tilt the plurality of solar collector nodes relative to the transverse beam; a plurality of solar collector nodes, each of the solar collector nodes comprising a collector node mechanical element engaged with one of the plurality of collector node mating elements on the rotating shaft; and a hollow cross section for receiving a fluidic conduit connecting each of the plurality of solar collector nodes.

In an embodiment, the solar tracker further comprises an electrical conduit in the transverse beam electrically connecting each of the plurality of solar collector nodes to an electrical main.

In another embodiment, the plurality of solar collector nodes comprise photovoltaic light collection cells, thermal collection cells, combined photo-thermal cells, or a combination thereof.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
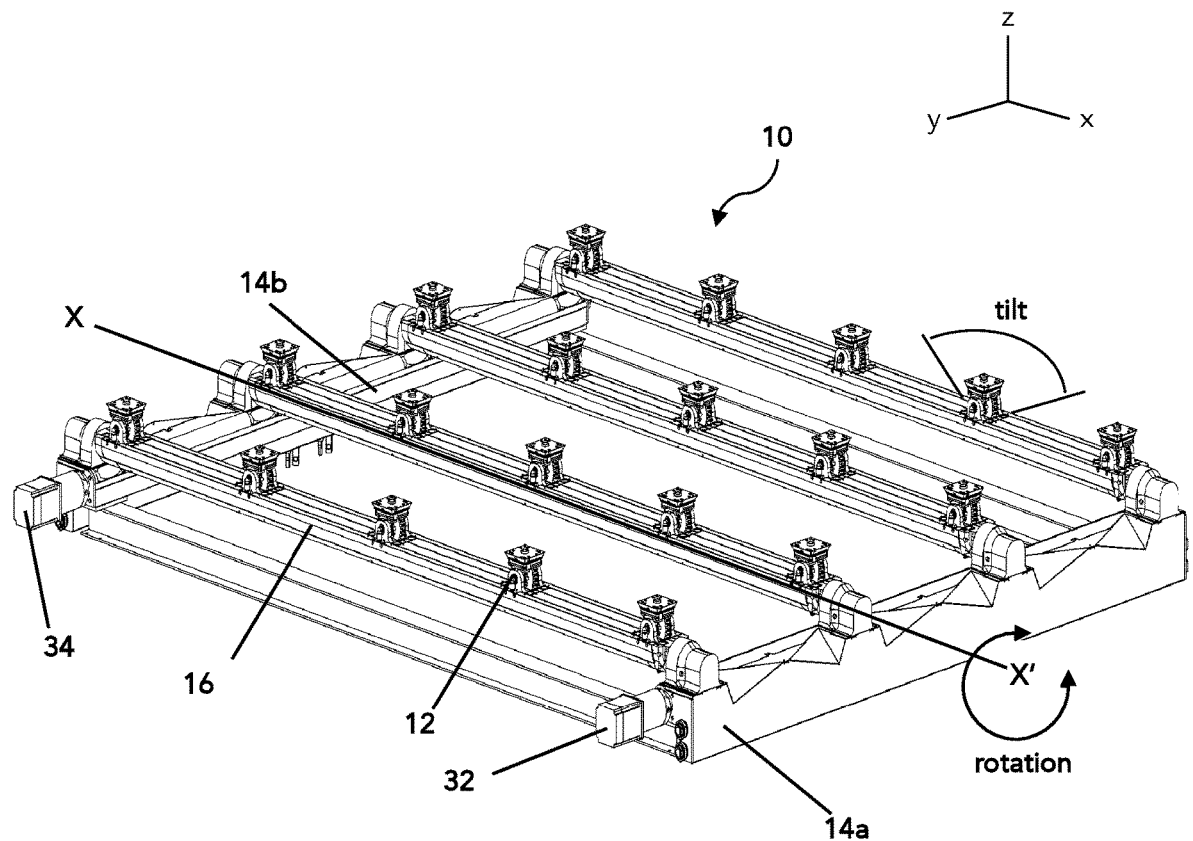
FIG. 1 is an isometric view of an embodiment of a dual axis solar array tracker showing the solar collector nodes.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein the term "mechanical system" comprises any set of mechanical elements interacting with each other and working together towards the same objective(s), such as transmitting energy/work, power, force, motion, between them. Some examples of mechanical systems which perform such transmission of energy/work, power, force, motion include but are not limited to gearing mechanisms (two or more elements, such as gears, and other types, such as worm drives, or of other types), mated linkage elements, joints, belts and cable systems (with pulleys and other elements), etc. For instance, a worm drive and worm gear mechanical system has the interesting property of irreversibility: motion, load, work, energy, power applied to the worm drive will result in the transmission to the worm gear(s) engaged with such worm drive, however the reverse does not occur (applied to the worm gear and transmitted to the worm). These systems can therefore be also maintained in a locking configuration, or position without the need of constantly applying loads, work, energy, power.

As used herein, the term "mechanical element" refers to a component of the mechanical system that will mate with other mechanical component(s) within such mechanical systems. A mechanical element may have one or more functions within mechanical systems, which may include, but not may be limited to being a vehicle for inputting, or outputting motion, loads, energy, work power to or from a mechanical system, or to transmit such to other mechanical element(s) within mechanical systems, to which they are engaged. Some examples of mechanical elements which can be included in mechanical systems include but are not limited to gears, worm drives, linkages, joints, belts, cables, pulleys, disks, etc.

Herein is described a low profile dual axis solar array tracker for supporting a plurality of solar energy harvesting elements at a plurality of solar collector nodes. The described dual axis solar array tracker has two perpendicular axes of movement, specifically a rotation axis at a rotatable transverse beam, and a tilt axis relative to the axis of the transverse beam, controlled by two different gearing systems each attached to a controllable motor. The dual axis design of the present solar tracker enables the movement of solar collectors such that they can be directed towards the sun wherein incoming solar rays will be perpendicular to the solar energy harvesting element of the solar collector to optimize collection of solar radiation. The low profile and low height of the presently described solar array tracker enables its easy use on any type of rooftop, being technically efficient and visually appealing. A variety of solar energy harvesting elements can be used with the present system including but not limited to photovoltaic light collection cells, thermal collection cells, combined photo-thermal cells, and other types, optionally including optical elements such as, for example, mirrors, lenses, and light-directing optical elements.

The solar array tracker is capable of dual axis tracking, but with a small profile and height, which reduces loads and moments from system weight and winds, while enabling distributed loading transmission to host structures. The solar array tracker can be mounted not only on horizontal surfaces but also on highly tilted and angled surfaces such as rooftops. Furthermore, the present solar array tracker provides a mechanism for possible solar cogeneration while enabling a very high concentration of solar elements working at maximum efficiency and load, per area occupied, therefore providing for a high concentration of harvested energy and power per occupied area. The present system is ideal for application on rooftops, either flat or slanted, where available area for installation of a solar harvesting system is small, constrained and at a premium, and energy consumption per plant area is usually high. This tracker configuration also presents a small profile, or height, therefore reducing shading to adjacent systems. Spacing between adjacent systems can therefore also be reduced, maximizing available space utilization for collecting solar energy, and achieving high harvested energy and power per available area. Structural complexity and weight are also reduced, with the solar array tracker enabling distributed loading transmission to host structures, and mounting to not only horizontal or flat surfaces. Solar cogeneration can also be supported, contributing further for a high concentration of harvested energy and power per occupied area, ex. in localized areas such as rooftops where available area is small.

In addition, the present solar array tracker provides an optimized distribution of loads, from the system weight and carrying the solar elements and accessory systems under wind and weather conditions compared to conventional single, double support, or tripod-type dual axis trackers. By lowering the profile and integrating the mechanical angling system to move the solar collectors, the presently described solar array tracker enables maximization of the area utilized for solar energy harvesting while minimizing the number of necessary motors and controls. An advantage of the present invention is that only two motor elements are needed at the most to move an array with several solar elements. As such, the operation of the presently described dual axis solar array tracker, including tracking, movement and orientation, can be managed by an automated system with computerized systems, ex. microcontrollers, microcomputers, and/or several sensors of different types. The present solar tracker also takes into account the possible transmission of electric currents and also fluid movement for thermal energy harvesting and thermal transfer (and possibly management) from the different solar elements, as well as the integration of corresponding necessary components for such systems to run and for their management.

FIG. 1 is an isometric view of an embodiment of a dual axis solar array tracker 10 showing the solar collector nodes 12. The dual axis solar array tracker has a first longitudinal beam 14a, and a second longitudinal beam 14b substantially parallel to the first longitudinal beam. Between the first and second longitudinal beams 14a, 14b are one or more transverse beams 16. The shown embodiment has four transverse beams, however other embodiments can have one, two, three, five, six, or more transverse beams extending between and connected to said longitudinal beams. The dual axis solar tracker can supporting a wide variety of types of solar collectors at a plurality of solar collector nodes 12, and can be fitted with one or more types of solar collectors at each of the solar collector nodes 12.

The present solar tracker can be installed on the ground or other horizontal surface, even, or uneven surfaces, but can also be installed on angled surfaces such as rooftop and walls, optionally with one or more mounting structures or mounting elements. Highest energy harvesting can be achieved by tracking the sun location relative to the location of the solar tracker and angling the solar collector nodes 12 at the sun such that the incoming sun rays are as close to perpendicular as possible. With the use of the present solar array tracker, the time during which the solar collectors are oriented toward the sun can be maximized, considerably augmenting the energy and power harvested. Further, the present system has a low profile, or low height relative to the mounting surface, which enables easy installation with little or no structural or mechanical reinforcement to either the solar tracker array or the surface to which the solar tracker array is mounted, enabling a desirable load distribution.

In the solar array tracker, longitudinal supporting structural elements or longitudinal beams 14a, 14b, are arranged substantially parallel to one another to support one or more transverse beams 16, with each transverse beam 16 supporting one or more solar collector nodes 12. A first gearing system in the first longitudinal beam 14a connects with a first mating gear, also referred to as a transverse beam gear, on each of the transverse beams to rotate the transverse beams 16 relative to the longitudinal beam 14a about the axis X-X' of the transverse beam 16. This rotation movement changes the angle of the solar collector nodes 12 in the y-z plane. A second gearing system in or aligned with second longitudinal beam 14b is operably connected with the transverse beam, which is in turn operably connected to each of the solar collector nodes 12 to tilt the solar collector nodes 12 in the x-z plane relative to axis of the transverse beams. In an embodiment, the solar array tracker is preferably mounted with the y-z plane aligned in a north-south direction, with the angle of the solar collector nodes on the transverse beam adjusted to accommodate for the season and height of the sun in the sky. As such, the tracker is preferably aligned with transverse beams from east to west, and the second gearing system enables the solar collector nodes 12 to be tilted at the correct angle to track the sun over the course of a day. Actuation of the first rotational gearing system rotates the transverse beam around axis X-X', and actuation of the second tilting gearing system commands the tilt of each of the solar collector notes 12 relative to axis X-X'.

On the first side of the transverse beam a first mechanical system engages the transverse beam with a mating element in the first longitudinal beam 14a, which can be preferably a worm drive and worm gear combination. Actuation of the first motion mechanical system by first motor 32 effects the rotation of the transverse beams connected with the first mechanical system. On the opposite or second side of the transverse beam a second mechanical system engages the transverse beam with a mating element in the second longitudinal beam 14b, which can also be preferably a worm drive and worm gear combination. The motion transmission mechanical elements along each of the first longitudinal beam 14a and the second longitudinal beam 14b preferably comprise axles intercalated with worm drives. When the second motor 34 is actuated at the second motion mechanical system in the second longitudinal beam, the second mechanical system inside the second longitudinal beam 14b rotates, causing the rotation of the axial elements connected to its output axle within the second longitudinal beam 14b.

These elements (preferably axles and connected worms) rotate causing the rotation of the engaged mechanical elements (preferably worm gears) at the second side of the transverse beams 16. The mechanical elements (as said, preferably worm gears) on this opposite or second side of the transverse members are connected, not directly to the traverse member, but instead to another set of axial components along or inside the transverse beam member, which then rotate with the worm gears used in the second mechanical motion system to tilt the solar collector nodes 12. As noted, the mechanical system and mechanical elements shown in the present Figures comprise worm drives and mating worm gears, however it is understood that other mechanical systems and mechanical elements can also be used.

Each of the transverse beams comprise axial components consisting of axle elements intercalated with mechanical transmission elements, which preferably can be worm drives, at desired positions. These axial components run within or along the transverse beams and interface with, and are supported by, the transverse beams through bearings, gaskets, and/or other structural components accounted for within the transverse beams. The length of these axial elements and therefore of the transverse beams can be changed, similarly to the longitudinal members, by changing the length of axle components, their number, and the number of mechanical transmission elements (ex. worms) applied. Selection of length and number of used components influence the number of solar energy harvesting elements or solar collectors per transverse beam, as in longitudinal beams influence the number of transverse beams applied. In case worm drives and gear combinations are used, these worms are then connected to worm gears. As in the longitudinal members, for this to happen, the transverse members containing the axial elements have openings at the locations of such mechanical transmission elements (ex. the worms). These openings are preferably encased in protective elements to shield the mechanical transmission system from the outside elements, such as weather, impacts, airborne particles and chemicals, dirt, debris, etc. In case worm drives and gear combinations are used, with the rotation of the worms, the worm gears will rotate with an axis perpendicular to the transverse members, and therefore perpendicular to the first axis of rotation of the tracking system along the transverse members. This provides for the second axis of the tracking system, since if worm drives and gear combinations are used, these worm gears also rotate around the first tracking axis, rotating with the transverse member when it is rotated. These mechanical elements at collector node locations, such as said worm gears have either structures attached, at such solar collector node locations, for holding solar elements, or solar elements directly attached to them. These are then enabled to rotate in two composite rotations, providing for a dual axis sun tracking system, pointing the solar elements attached to mechanical system elements at collector nodes locations (ex. the worm gears), in the traverse members, always towards the sun and maintaining their perpendicularity with respect to the incoming solar rays for maximum energy harvesting efficiency and amount of energy harvested by said solar elements.

The longitudinal beams and transverse beams can be made of any supporting structural element, such as one or more beams, bars, rods, hollowed beams, extrusions, rods, or a combination thereof. Beams can consist of a single or multiple of these elements, both along their length, and/or cross section. The two longitudinal beams 14a, 14b serve as supporting structural elements and also enable the installation of the solar tracker to a desired surface area, or by utilizing only certain anchoring points along said longitudinal elements, for example to connect to poles, lifting mechanisms, or other supporting structures. The two longitudinal beams also enclose or connect to the moving parts of the system commanding rotations on a desired number of transverse beams as described.

In use, to adjust the orientation of solar collector nodes in the dual axis solar tracker a computerized system, with a microcontroller, or microcomputer, analog or digital circuitry, or any other similar device/circuit/system, or a combination of these, receives a signal to adjust the orientation of the solar collector nodes and controls a first motor 32 operatively connected to the first longitudinal beam comprising the first mechanical system and a second motor 34 operatively connected to the second longitudinal beam and the second mechanical system. The rotation angle of each of the transverse beams extending between the first longitudinal beam and the second longitudinal beam is controlled by the first transverse beam mechanical element at the first end of the transverse beams. The first transverse beam mechanical element engages with the first longitudinal beam mating element on the first mechanical system and operation of the first motor to the first mechanical system causes the transverse beams to rotate relative to the first longitudinal beam. Operation of the second motor operatively connected to the second mechanical system in or adjacent to the second longitudinal beam engages a second longitudinal beam mating element on the second mechanical system which is operatively engaged with a second transverse beam mechanical element on the second end of the transverse beam to rotate a rotatable shaft inside the transverse beam. The rotatable shaft has a plurality of collector node mating mechanical elements which each connect with and engage a collector node mechanical element on a solar collector node location. In the when case worm drives and gear combinations are used, rotation of the collector node gear causes the plurality of solar collectors, at such node locations, to tilt relative to the axis of the rotatable shaft and the transverse beam. These two actions enable the present system to always have the attached solar elements pointing towards the sun, perpendicular with solar rays, thus maximizing efficiency of energy harvesting and the duration at which energy harvesting is being performed at such maximized efficiency, with the consequence of considerably increasing power and total energy harvested. Although the shown configuration has the first motion mechanical system in the first (right) longitudinal beam 14a and second mechanical system in the second (left) longitudinal beam 14b, it is understood that these could also be reversed.

Each motor, i.e. the first motor 32 and the second motor 34, may also include a positioning sensing system, forming a feedback loop with the electric motor and associated controller, such as different types of electric motors can be used, which may include also servos, and stepper motors, or any other type of sensor to provide feedback on the motor actuation and gear position. The first motor 32 and the second motor 34 are each connected to the ends of each of the first longitudinal beam 14a and the second longitudinal beam 14b, respectively, and have their output axle connected directly, or through a gearbox to an axial element in the first motion mechanical system and second motion mechanical system respectively. These axial elements can consist of several axles having in between them, and being connected to, worm drives, or other mechanical transmission and motion system. In case worm drives and gear combinations are used, preferably, the worm drives are positioned at certain points along each axial element, and therefore at certain positions along the longitudinal beam members. The axial elements of each mechanical system, with one axial element running inside or alongside each longitudinal member, can have any desired length, which can be changed as required by prolonging it through the use of axial connecting elements and further axles and motion mechanical transmission elements (ex. worms), or by using axles with increased length. As well, the number of traverse members can be increased by increasing the number of motion mechanical transmission elements (ex. worms) in the axial elements. In an embodiment, with axial members running inside the longitudinal beam members, moving components, including the axial elements, are protected from the outside (weather, impacts, etc.) by the said longitudinal members. To enable this possible design configuration, the longitudinal beam members can be further designed to provide for support, including optional or additional structures, systems and components, such as, for example, bearings, gaskets, spacers, etc., to the moving components.

Each of the first and second motors are operated by one or more computerized systems, with one or more microcontrollers, or microcomputer(s), analog or digital circuitry, or any other similar device/circuit/system(s), or a combination of these, which send a signal to each motor to appropriately rotate the transverse beams and/or tilt the plurality of solar collector nodes to optimize the angle of the solar collector nodes such that they are substantially perpendicular to the incoming rays of the sun. In an optimized design, each tracker or each small number of trackers, for example installed within a solar harvesting unit, in a same location, will have a dedicated automated control system, with several of those automated systems feeding into and being controlled by a main automated unit. These automated units may include one or multiple microcontrollers, and/or microcomputers, and/or dedicated electronic boards, memory, power, interfaces for input and output of data, and sensors. Other sensors can be utilized and can include but are not limited to one or more light sensors, light intensity sensors, flow related sensors such as volume flow, flow speed, including for instance wind speed and direction, gyroscopes, accelerometers, magnetometers, inclinometers, inertial measurement units (IMUs), current sensors, voltage sensors, and temperature sensors. The one or more electronic units can further be connected to the internet and can respond to collected data on weather, location, season, sun angle, sun behaviour (such as sun spot activity), temperature, wind speed, and other data.

The dual axis solar array tracker can be made longer, larger, or smaller, as desired, and can further comprise additional non-geared transverse beams and/or longitudinal beams for providing additional support, depending on the desired size. In particular, one or more longitudinal beams can be mechanically connected together such that a single motor can power one or more mechanically tethered mechanical systems for tilting or rotating the transverse beams. Additionally, a single central longitudinal beam can be used to control either the tilt or rotation of transverse beams connected on both sides. The array can further comprise one or more mounting devices for mounting the array on a surface. The present dual axis solar tracker has a straight-forward construction which simplifies manufacturing, assembly, and installation compared to other solar tracker systems. As previously mentioned, the smaller height, or lower profile of the system simplifies distribution of installation loads, which is important when assembly and installation of the tracker is to be performed on sloped surfaces such as slanted rooftops. Further, the small height of the dual axis tracker makes it visual appealing for installation onto rooftops. One or more tracker systems can also be linked, and the present design can enable the assembly of one tracker to an adjacent tracker, if desired, making a single unit.

Figure 2:
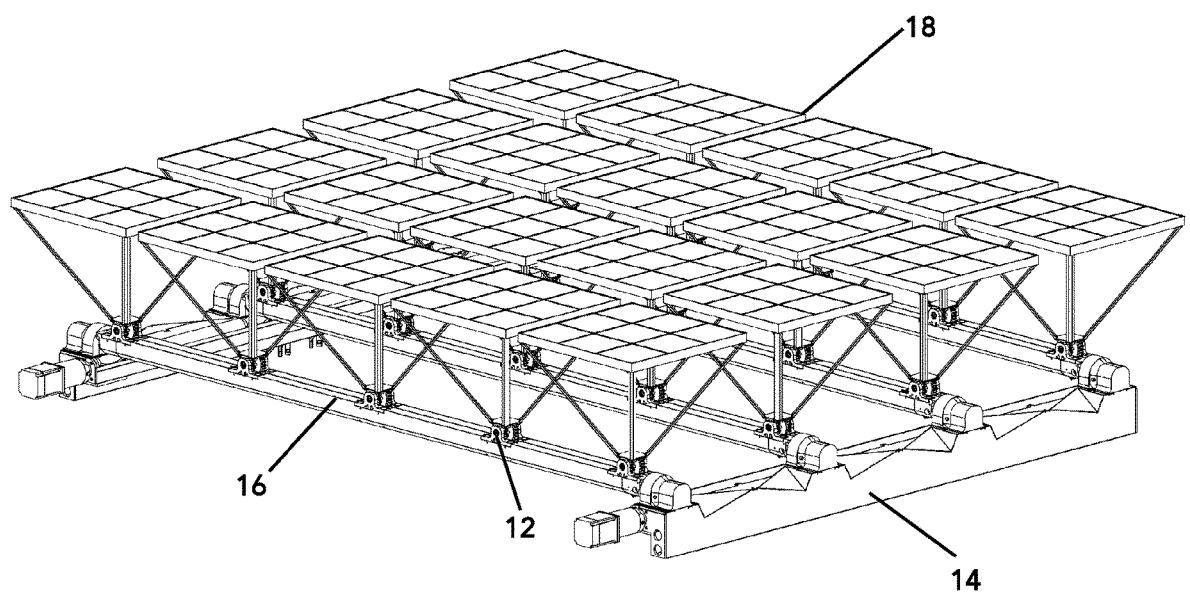
FIG. 2 is an isometric view of an embodiment of a dual axis solar array tracker attached to solar collectors pointed up.

FIG. 2 is an isometric view of an embodiment of a dual axis solar array tracker comprising solar collection or solar energy harvesting elements attached to the solar collector nodes 12 with solar collectors pointed up. In this configuration, the solar energy harvesting elements are elevated relative to the solar collector nodes to provide additional range of movement, which maximizes the solar energy collection to surface area of the present system. The shown dual axis solar tracker has the capability of supporting a wide variety of types of solar collectors 18 at a plurality of solar collector nodes 12. A solar collector is any type of solar energy harvesting element that collects solar radiation from the sun, preferably to convert the solar radiation into useable energy. A solar collector can comprise one or more optical, mechanical, and electrical and/or thermal energy harvesting and/or thermal transfer components. Solar collectors can be of a wide variety of shapes and sizes and can have a wide variety of cross-sections. Shown here are a plurality of panel-style solar collectors 18 supported by a plurality of solar collector nodes 12 on the longitudinal beams 14 and transverse beams 16 of the present design. Each solar collector 18 can also optionally include one or more optical components such as, for example, reflective component(s), and/or lens(es). There are various types of solar cells, including photovoltaic cells, thermal cells, solar-thermal cells, and other types of solar cell. A solar element comprises one or more solar cells, or multiple cells forming a solar panel of desired dimensions. Accordingly, multiple solar cells can be connected to a single solar collector node and can be arranged or arrayed in an integrated group to constitute a solar photovoltaic, or solar thermal, or cogeneration panel or module, optionally also including one or more light reflective components and/or light focusing components to maximize the amount of light received by each solar cell.

Figure 3:
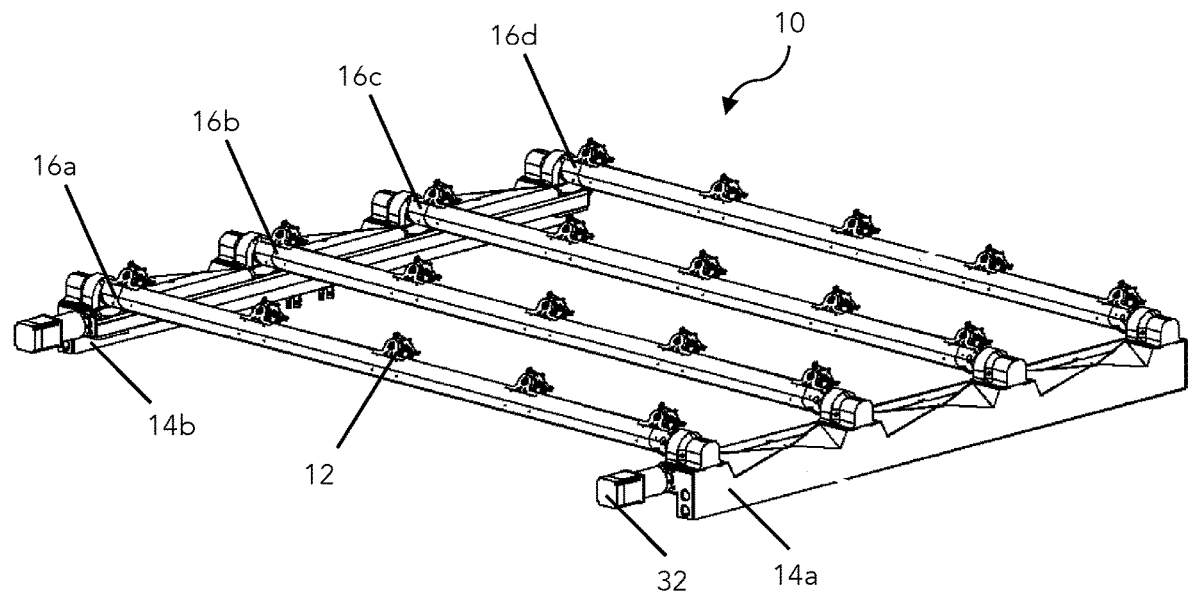
FIG. 3 is an isometric view of an embodiment of a dual axis solar array tracker with solar collector nodes pointing at an angle.

FIG. 3 is an isometric view of an embodiment of a dual axis solar array tracker 10 with solar collector nodes 12 at an angle. The dual axis solar array tracker is shown with the transverse beams 16a, 16b, 16c, and 16d rotated relative to the transverse beam axis (as shown in FIG. 1), with actuation of the rotation enabled by first motor 32. Longitudinal beams 14a and 14b support transverse beams 16a, 16b, 16c, and 16d, and at least one of longitudinal beams 14a and 14b comprises a first mechanical system to engage with transverse beams 16a, 16b, 16c, and 16d to rotate the transverse beams 16a-d as a group.

Figure 4:
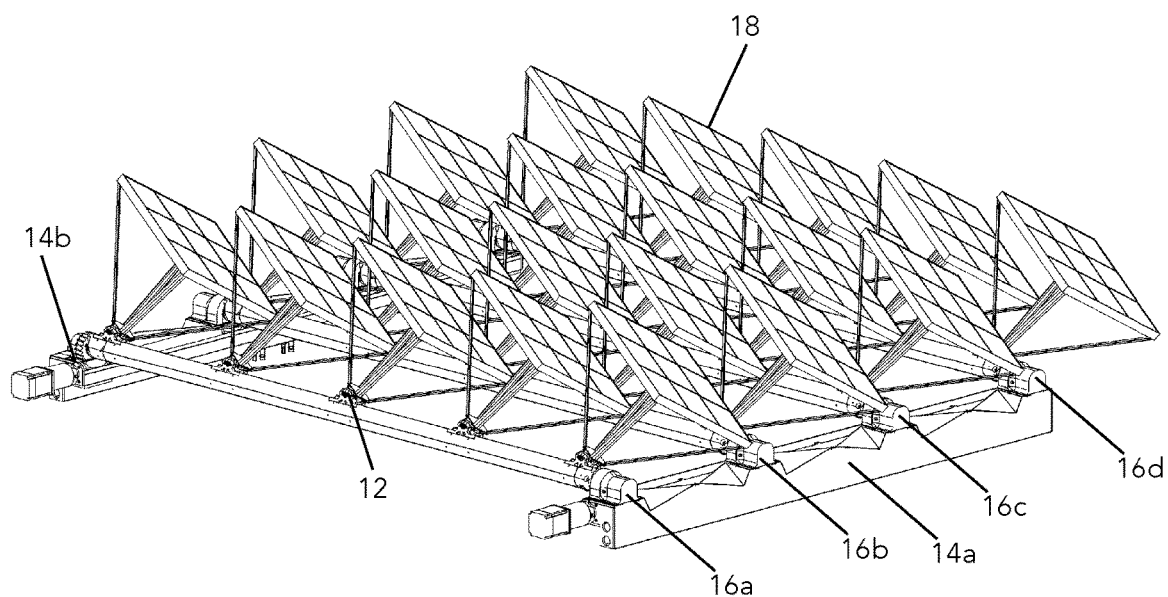
FIG. 4 is an isometric view of an embodiment of a dual axis solar array tracker attached to solar collectors pointed at an angle.

FIG. 4 is an isometric view of an embodiment of a dual axis solar array tracker with solar collectors 18 attached to solar collector nodes 12 at an angle, pointed toward the sun. Longitudinal beams 14a and 14b support transverse beams 16a, 16b, 16c, and 16d in the dual axis solar array tracker. To achieve the desired angle for the solar collectors 18, the rotation of the transverse beams 16a-d and tilt of each of the solar collector nodes 12 relative to the transverse beam to which it is connected is adjusted using the first and second motors, and through the first and second mechanical systems. The number of solar elements which can be installed in a tracking system can be changed depending on the number of transverse beams, and therefore the number of mechanical transmission elements (ex. worm drives) along the longitudinal beams, and the number of mechanical transmission elements (ex. worm drives) in each transverse member. The spacing between both longitudinal and traverse beam mechanical drives (ex. worms) can be changed to accommodate different sizes of solar elements. This spacing is uniquely restricted by the dimensions of the solar elements to avoid impacts between neighboring solar elements at any time during tracking. A very high area density occupancy by energy harvesting elements is therefore obtained, obtaining the highest amount of energy harvested, with peak efficiency.

Figure 5A:
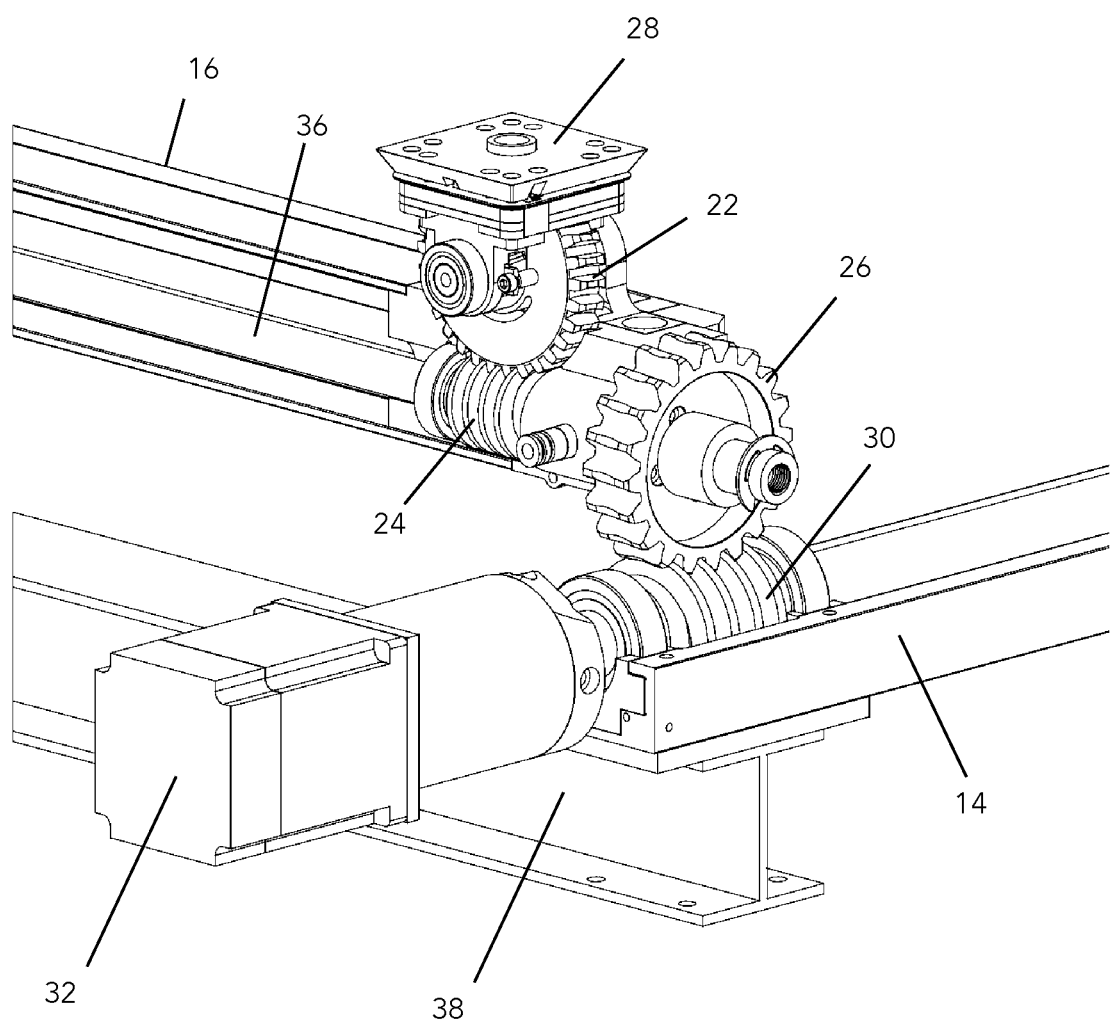
FIG. 5A is an isometric view of an intersection of a transverse beam and a longitudinal beam with a gearing system.

FIG. 5A is an isometric view of the intersection of the first end of a transverse beam 16 and a first longitudinal beam 14 in one of the embodiments, with an optional stability or mounting frame 38. The integration shown enables rotation of the transverse beam 16 about its axis, and relative to the first longitudinal beam 14, however it is understood that the gearing systems in the longitudinal beams can be on either side of the solar array tracker. For clarity, each of the two longitudinal beams in the solar tracker has a single mechanical system and dedicated motor, with one of the mechanical systems for rotating the transverse beams and the other mechanical system for tilting the solar collector nodes, with each mechanical system being integrated with the dedicated motor. In this embodiment, collector node gear 22 in the solar collector node engages with collector node mating worm 24 on the rotatable shaft 36 of transverse beam 16. In a preferable embodiment the collector node 22 has a mechanical transmission element and collector node mating gear 24 are a worm gear and worm drive system as shown, however other mechanical transmission systems can be used including but not limited to bevel gear systems, rack and pinion gear systems, as well as other known gear systems, linkages, belt drives, as well as other motion and mechanical transmission systems. To enable engagement of the shown longitudinal beam mating mechanical element which in this embodiment is a longitudinal beam mating worm drive 30, the longitudinal beams containing the longitudinal axial elements of the mechanical system have openings at the locations of such mechanical mating elements (ex. the worm drives). Preferably, these openings are encased in protective elements to shield the mechanical system from the outside elements, such as weather, impacts, etc.

The preferable use of worm drives and gear combinations is related with their irreversibility. For the present purpose, this means that any load, such as from wind, own weight and resulting moments of supported structure by the gear system, etc., will not be able to make the gear system, or supported elements by the gear mechanism, to move from the desired set position. Therefore, such desired position can only be set by commanding the movement of the gear mechanism (ex. directly or indirectly with the motors). Specifically, if a worm gear set is used, the worm gear can be adjusted and set to a stable configuration by commanding the worm to rotate until a desired position is reached and is set. In such an embodiment, worm gears at the ends of the transverse beams are connected to axial components in the first rotational gearing system which are kept in place, guaranteeing and stabilizing the correct engagement and spacing of the worm gears to the worms, by structural elements, such as brackets. These structural elements (ex. brackets) are attached to the longitudinal beams and allow the axial gearing elements from the transverse beams, to which worm gears are connected to, to pass through them. To keep such axial components in place and simultaneously allowing their rotation, connecting components such as bearing elements can be used.

Solar cell attachment 28 is designed to receive a solar collector or solar energy harvesting element and provide electrical and/or thermal fluid integration with the solar collector to harvest energy from the photovoltaic and/or photo thermal cell(s) in the solar collector. All structural elements, including the longitudinal beams and transverse beams, allow for electrical and/or thermal fluid transmission. This can be done with electrical wiring and/or fluid conduit (s), and respective connectors, externally to such structural elements and/or moving mechanism at such locations, and/or by integrating such transmission elements and connectors with said structural elements and mechanisms. This last configuration can be achieved, for instance, by integrating connections and respective connectors with said structural elements and mechanisms, and/or by passing electrical and/or thermal fluid conduits within structural elements and mechanisms, through hollowed cross sections, channels, cavities, etc. Beyond passing electrical wiring and/or thermal fluid conduits within hollow cross sections of transverse and longitudinal beams (fully or partially hollow, within channels in, or particular cross section cells, when cross section is divided in several hollowed parts), possible embodiments may also include the transmission of electrical and/or fluidic thermal energy from a rotating to a static frame. For instance this may be verified: from a dual axis rotation frame as is the case of the solar collectors, through the inside of their worm gear, to the hosting transverse beam, as a single axis rotation frame; or from a transverse beam (one axis of rotation), through the inside of its worm gears, located at its ends, to one or more main conduits running along or within longitudinal beams.

Figure 5B:
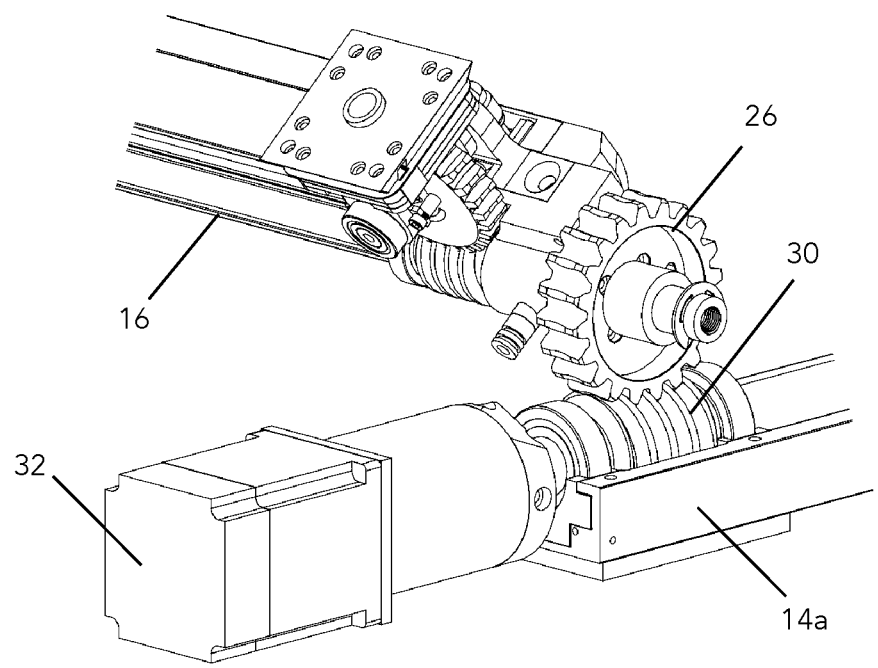
FIG. 5B is an isometric view of an intersection of a transverse beam and a longitudinal beam with the transverse beam rotated about its axis.

FIG. 5B is an isometric view of an intersection of a transverse beam and a longitudinal beam with the transverse beam rotated about its axis, in one of the envisioned embodiments. One or more transverse beam gear 26 on the transverse beam connects with longitudinal beam mating worm drive 30 for turning or rotating the transverse beam 16 relative to the axis of the transverse beam. At one side of each transverse beam 16, which is the same side for all of the transverse beams in the tracker, the transverse beams are all connected to the same gearing mechanical system in one of the longitudinal beams, preferably via a worm gear. The transverse beams can be for example a beam, bar, hollowed beam, or bar, extrusions, or other type of structural element, and can consist of a single or multiple of these elements, both along their length, and/or cross section. By being connected to the transverse beam, when the worm gear rotates, it causes the rotation of the transverse member along its longitudinal axis, providing for the first axis of tracking. Therefore, when the first motor 32 connected to the first longitudinal member 14*a* rotates, it causes the rotation of the axial elements in the first mechanical system connected to its output axle and within, or along the first longitudinal beam 14*a*. In this embodiment, these axles and connected worms rotate causing the rotation of the worm gears at the first side of the transverse members. As mentioned previously, with the worm gears being connected to the transverse members, the rotation of the worm gears cause the rotation of connected transverse members along their axes.

The motor 32 is preferably fixed to the longitudinal beam and is connected, either directly or through a gearbox, to axial elements running along the longitudinal beam. The longitudinal beam motor 32 controls the movement of the first mechanical system in the longitudinal beam 14*a*, commanding the orientation of several solar elements. These axial components, through one or more mechanisms, transmit rotational motion to the transverse beam elements. This means that solar collector nodes attached to the traverse beams are enabled to rotate around the axis of the traverse beams of the tracking system, providing for the first axis of the tracker or tracking. When referring to the 'dual axis' tracking system, the rotation of the transverse beams around the transverse beam axis is referred to as the first axis of movement.

Figure 5C:
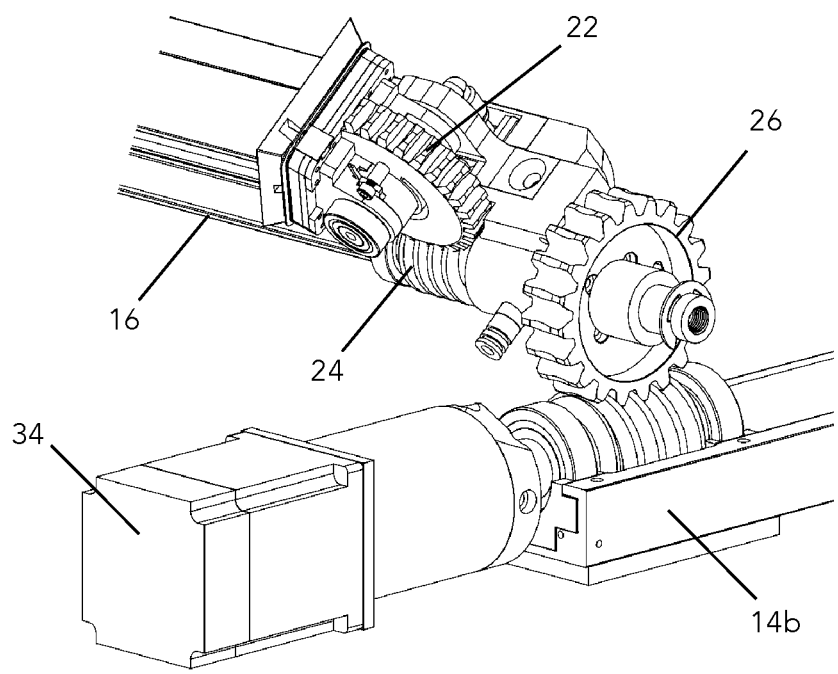
FIG. 5C is an isometric view of an intersection of a transverse beam and a longitudinal beam with the transverse beam rotated about its axis and the collector node gear tilted.

FIG. 5C is an isometric view of an intersection of a transverse beam and a longitudinal beam, in one embodiment, with the transverse beam rotated about its axis and a collector node gear tilted. On the opposite side or second side of the transverse beam 16 in the second longitudinal beam 14b, tilting motion is transmitted to axial elements along the transverse member through a rotatable shaft. Through several gear mechanism sets along said axial elements in the second mechanical system, this tilting motion is converted to the tilt of solar collector nodes connected to said gear mechanism sets, or structures holding said solar elements and protruding from said gear mechanism sets, along the transverse beams. Such tilt movement occurs around an axis perpendicular to the transverse beams, providing for the second axis of the tracker. This second axis or tilt is actuated by the second motor 34 which acts on the second mechanical system in the second longitudinal beam and transfers rotation from a transverse beam gear 26 or other mechanical element to the rotatable shaft of transverse member and therefore to one or more collector node mating worm 24. Each collector node mating worm 24 is operatively connected to a collector node gear 22 which tilts the solar collector node 12 relative to the rotatable shaft and the transverse beam 16 to which it is attached. Although collector node mating gear 24 and collector node gear 22 are shown as a mating worm drive and worm gear, respectively, it is understood that other embodiments can use different mating mechanical elements to perform a similar function.

Figure 6:
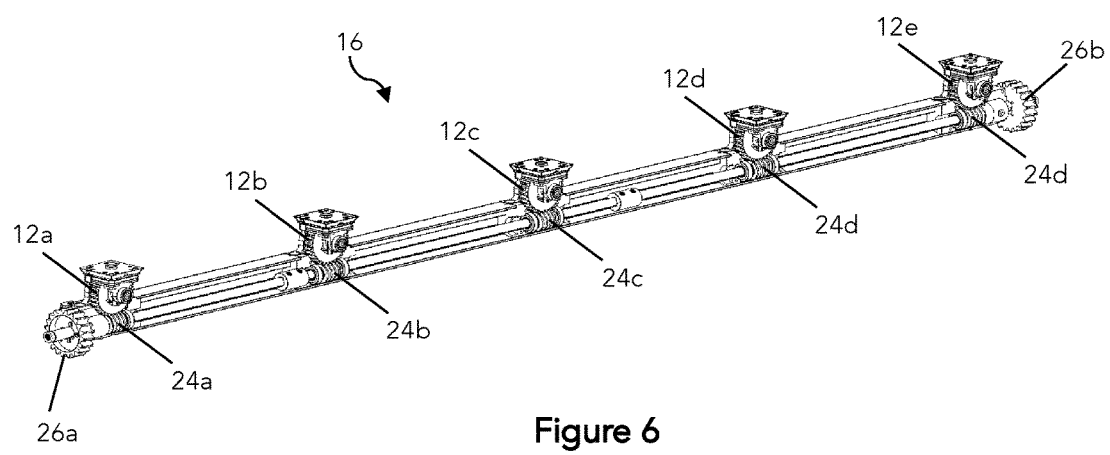
FIG. 6 is an isometric view of a transverse beam with multiple solar collector nodes.

FIG. 6 is an isometric view of a transverse beam 16 with multiple solar collector nodes. In this embodiment, a plurality of collector node mating worms 24a, 24b, 24c, 24d, and 24e mate with corresponding collector node gears on each of solar collector nodes 12a, 12b, 12c, 12d, and 12e, respectively, to tilt each of the solar collector nodes 12a-e relative to the transverse beam 16. In this embodiment, electrical and/or thermal (ex. fluidic based) systems can be connected or included in the described tracking system with electrical and/or thermal energy transmission integrated, in design, with the tracker. For example, electrical wiring and/or fluid can be routed to and from the solar elements through and/or within, or along the described longitudinal and transverse structural elements, from and to a non-moving main, which can be attached and/or integrated within the structural members. While external wiring and/or fluid conduits can be used, electrical wiring and/or fluid can also preferably be passed through structural members, such as gears, axles, axial elements, either off the shelf or purposely designed, and brackets, etc., while routing those to and from the solar elements, as a rotating frame, from and to a static main. For example, slip-rings may be used to help achieve such. In this embodiment, one of transverse beam gears 26a, 26b control the rotation movement of the transverse beam relative to the longitudinal beam, and the other transverse beam gear 26a, 26b controls the tilt movement of the solar collector nodes 12a-e relative to the axis of the transverse beam.

Figure 7:
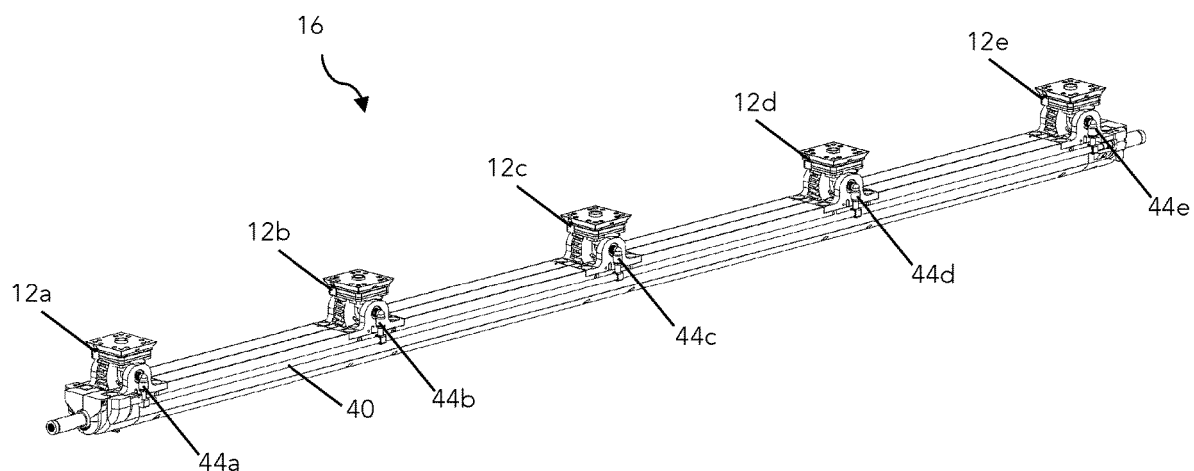
FIG. 7 is an isometric view of a transverse beam with integrated thermal conduit.

FIG. 7 is an isometric view of an embodiment with a transverse beam 16 with an integrated thermal conduit for collecting thermal energy and/or controlling thermal flow within the tracker and solar elements. In this embodiment of the system, a photoelectric collector can be used with means for enabling thermal energy transfer; a thermal collector can be used instead of a photoelectric collector; or a combination of both can be applied. The combination of a photoelectric collector and a thermal collector can increase collected energy from solar rays to improve the energy harvesting efficiency of the system. In this embodiment, solar collector nodes 12a, 12b, 12c, 12d, and 12e are each fluidly connected to a collector node fluid conduit 44a, 44b, 44c, 44d, and 44e. Thermal fluidic systems can also be connected or included in the described tracking system, for example inside a transverse beam supporting axle 40. The thermal fluidic systems can be integrated in design with the tracker and embedded into or alongside the described longitudinal beams and transverse beam components. In one example, fluid conduits can be routed to and from the solar elements through the moving frame through and/or within the described structural elements, from and to a non-moving main, which can be attached and/or integrated within the longitudinal and transverse beam members. While external fluid conduits can be used, the integration of slip-rings, for example, can assist with the passing of fluid conduits (and/or electrical energy) through structural members, such as gears, axles, axial elements, and brackets, etc., while routing those to and from the solar elements, from and to a static fluid main. In this way, transmission of electrical currents and fluids through the solar collector nodes enables cogeneration of electricity (and possibly of other forms of power, such as directly for heating, and/or cooling) through a combination of a thermal and photoelectric energy capture mechanism. The fluid conduit system can also include a heat sink or cooling system for concentrated solar energy received at the solar cells to preserve the life of the solar cells and protect heat-sensitive components from overheating. Preferably, the circulating fluid is one that has good thermal conductivity, low viscosity, long-term chemical and physical stability, low optical absorption, good optical stability, is non-toxic, and cost effective, maintaining its characteristics for a proper range of operating temperatures.

Figure 8A:
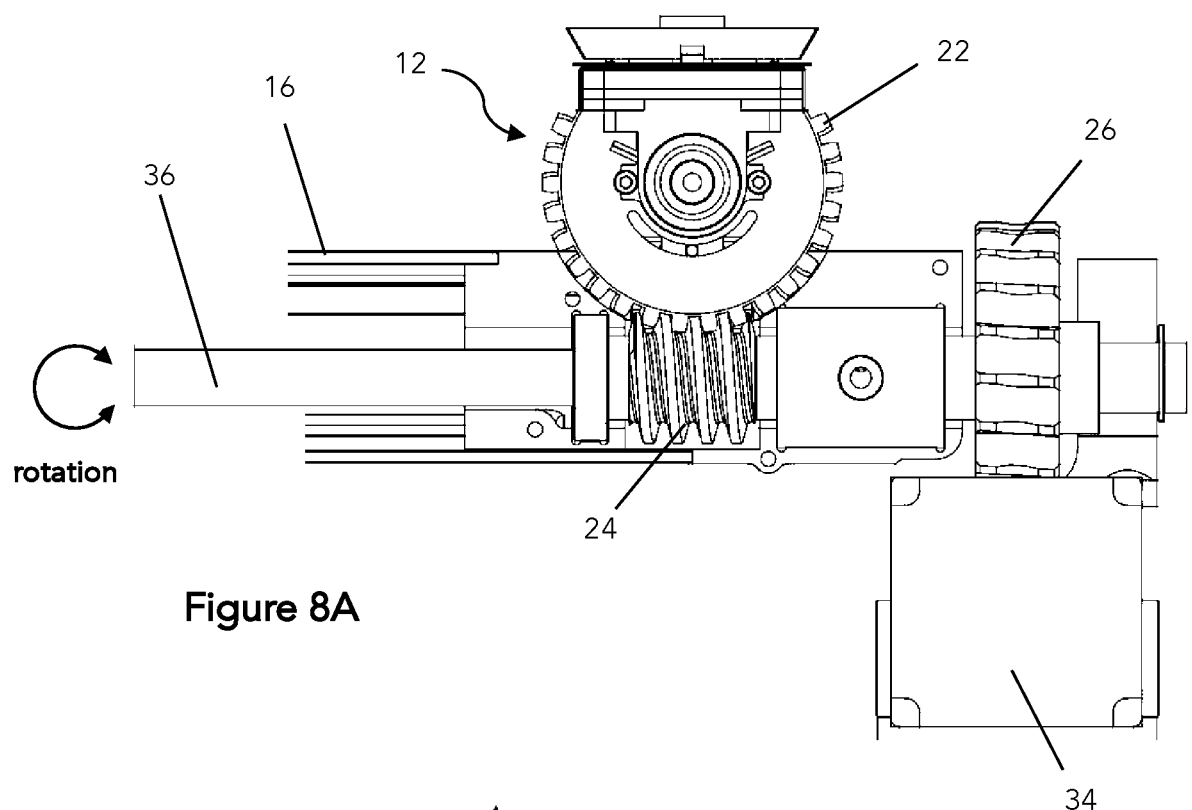
FIG. 8A is a side cross sectional view of a single solar collector node gearing mechanism on a transverse beam.

FIG. 8A is a side cross sectional view of an embodiment for a single solar collector node gearing mechanism on a transverse beam 16, in the second motion mechanical system. Second motor 34 is operatively connected to the second longitudinal beam and the second mechanical system, which, in this case, comprises a transverse beam gear 26 to turn a rotatable shaft 36 in the transverse beam 16. Operation of the second mechanical system turns a rotatable shaft 36 to which a collector node mating worm 24 is engaged, which in turn, turns a collector node gear 22, in this embodiment, to tilt the solar collector node 12 relative to the rotatable shaft 36 and transverse axis.

Figure 8B:
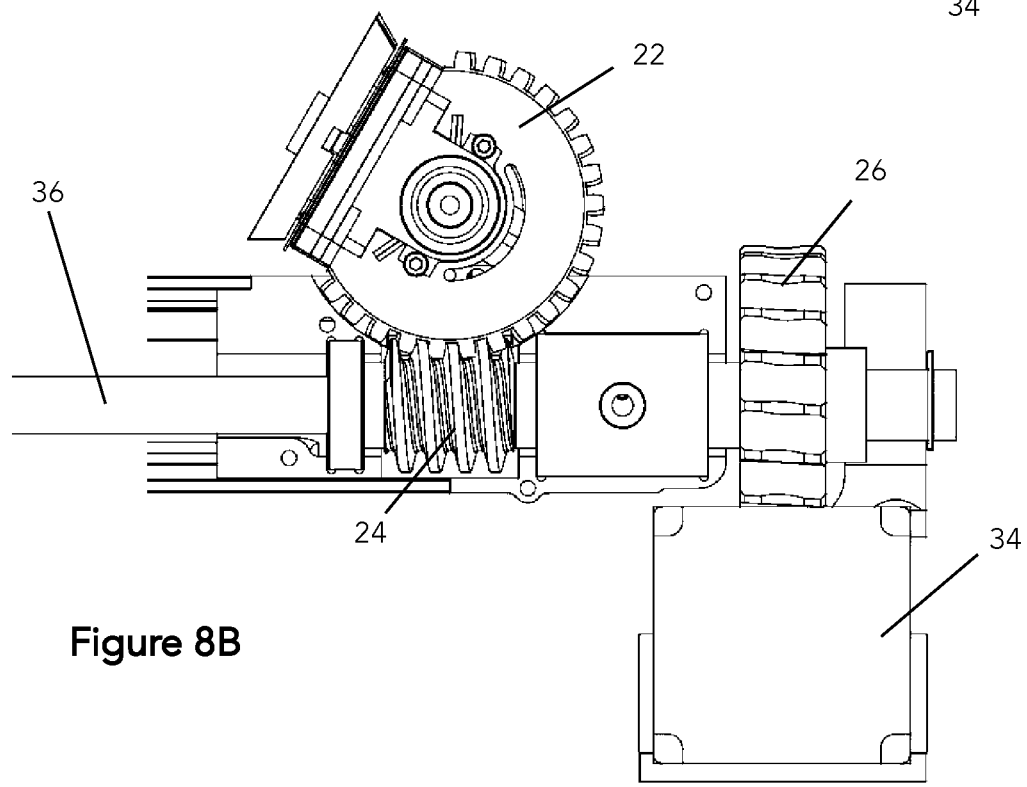
FIG. 8B is a side cross sectional view of a single solar collector node gearing mechanism on a transverse beam tilted to the left.

FIG. 8B is a side cross sectional view of an embodiment with a single solar collector node gearing mechanism on a transverse beam tilted to the left upon engagement of the second motion mechanical system by second motor 34. As shown, in this case, a transverse beam gear 26 turns a rotatable shaft 36, in the transverse beam, and collector node mating worm 24, which turns a collector node gear 22 to tilt the solar collector node relative to the rotatable shaft 36 and transverse axis.

Figure 9:
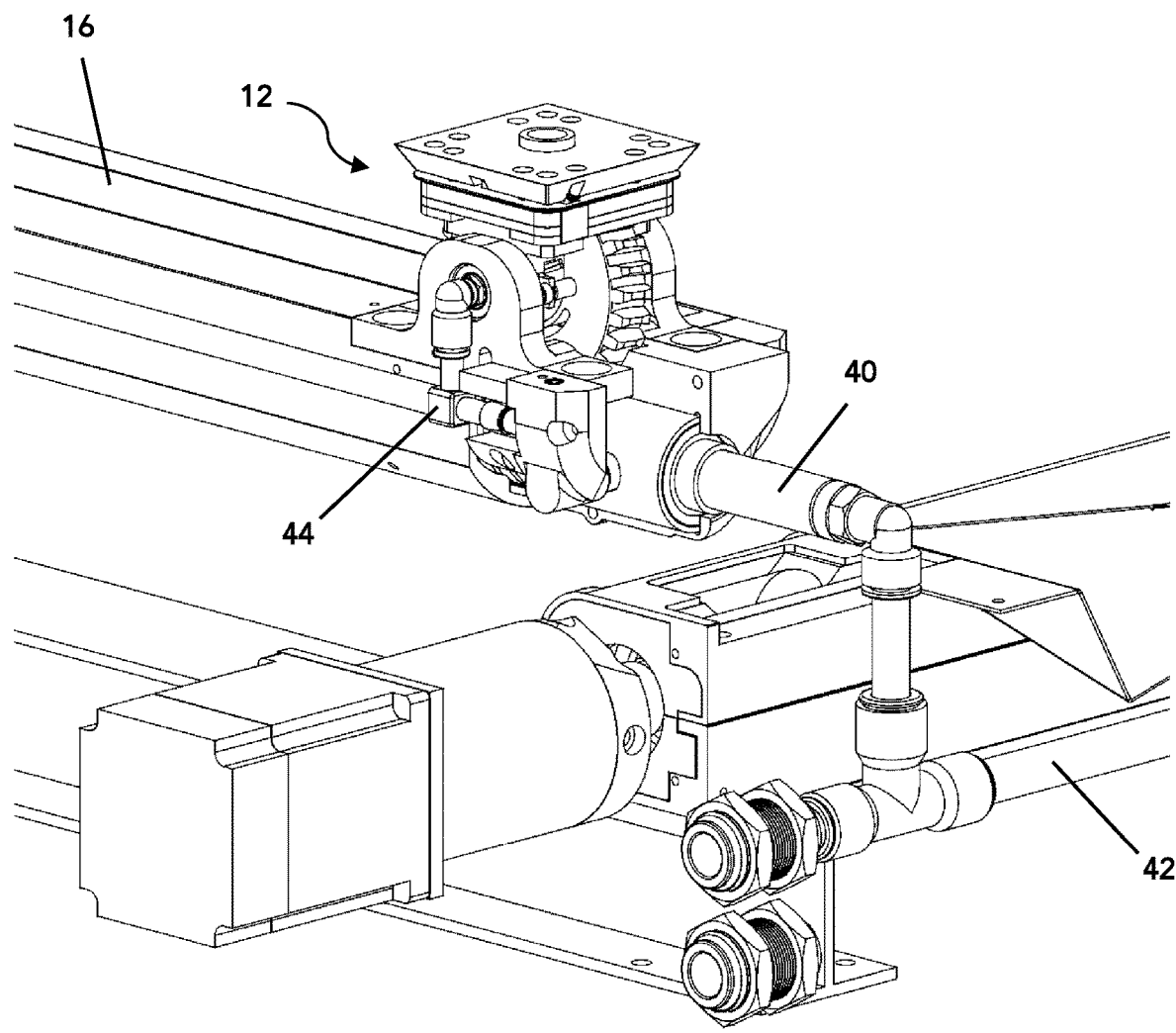
FIG. 9 is an isometric view of a single solar collector node on a transverse beam with integrated thermal system.

FIG. 9 is an isometric view of a single solar collector node 12 on a transverse beam 16 with one possible configuration for an integrated fluid based thermal and/or thermal management and transfer system, as opposed of routing such system through the outside of the presented tracker and its respective structural elements and mechanisms. The presented tracker can support the transmission of electrical and/or thermal energy (for instance based on fluid transmission). Also, the transmission of electrical and/or thermal energy, and/or fluids can be performed for instance with electrical wiring and/or fluid conduit(s), and respective connectors, externally to the structural elements and/or moving mechanisms of the tracker, and/or by integrating such transmission elements and connectors with said structural elements and mechanisms. One example for a fluid transmission system for thermal energy transfer is depicted with the proposed solar tracker. In this configuration, depicted in this figure, a worm gear at the end of the transverse beam was omitted, as well as its connections to the transverse beam and its supporting bracket to the longitudinal beam, for clarity. It can be seen in this configuration of the system, the thermal energy transmission fluid system integrated with the proposed tracker, with said fluid being routed to and/or from the solar collector node 12 through the centre, or the axis of rotation of a solar collector node worm gear and through the centre of its hollowed supporting axle 40 and bracket, to and/or from the outside of such bracket in the transverse beam. In this configuration, several fluid conduit elbows 44 are employed, with these being mounted either on the outside, or on the inside of the hollowed transverse beam (cross section). In this configuration, the fluid is then routed from, or towards the centre of the transverse beam and through the centre of the omitted worm gear at each end of the transverse beam. It is then passed by the worm gear and subsequently the transverse beam 16, through a transverse beam supporting axle 40, hollowed at its centre. With this axle being supported and sitting in (or within) the omitted respective longitudinal beam bracket, the fluid is therefore passed through said bracket to or from the outside of it. Another elbow can be seen in the figure for this possible configuration, routing the said fluid to or from a main fluid conduit 42. This conduit may run alongside or inside the respective longitudinal beams and may be incorporated with those.

Figure 10:
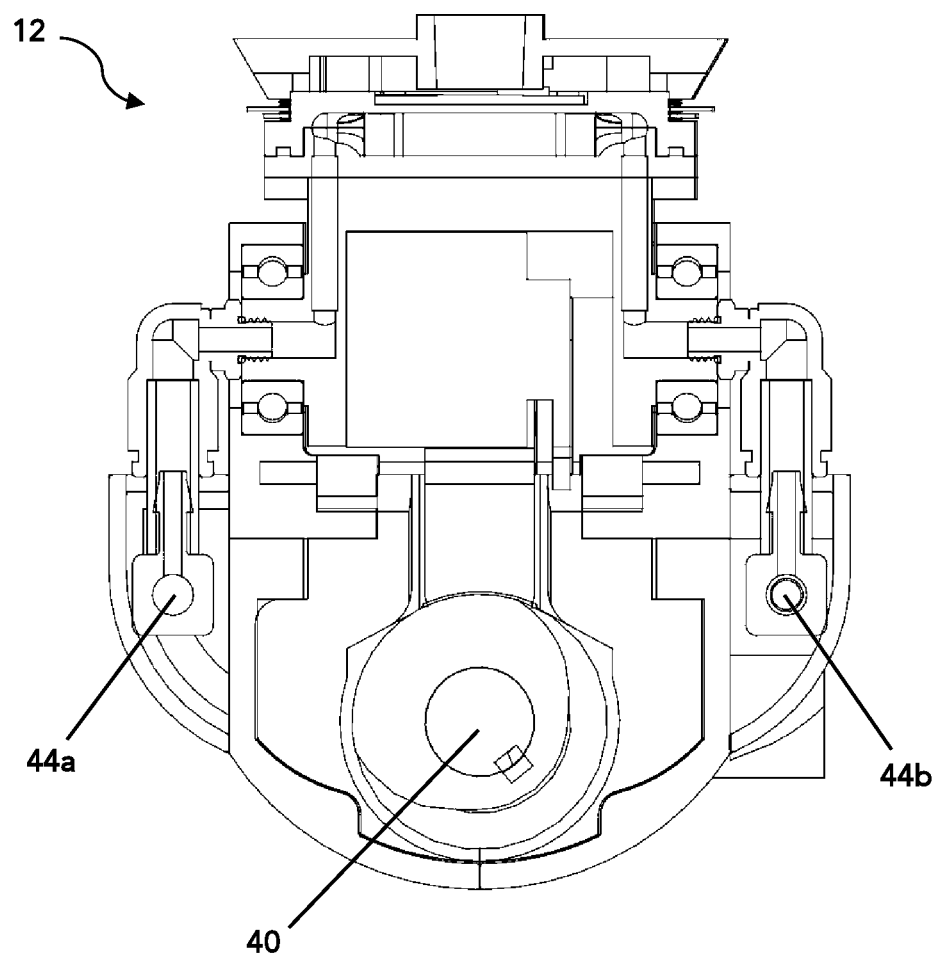
FIG. 10 is a close-up cross sectional view of a single solar collector node with thermal collection system.

FIG. 10 is a close-up cross sectional view of a single solar collector node 12 with a possible configuration for a possible integrated thermal collection and/or thermal transfer system (as opposed of routing such system through the outside of the presented solar collector node and its respective structural elements and mechanisms). In this figure, a close up for a possible configuration for the solar collector node is presented. The cross section of a possible transverse beam end worm gear (and subsequently transverse beam) supporting axle 40 is hollowed at its centre. On each side of the transverse beam cross section, a cross section view of the fluid conduit elbows 44a, 44b. In this configuration, it can be seen that the fluid is routed from and/or to said elbows through the centre of the solar collector node 12, or the axis of rotation of the solar collector node worm gear and through the centre of its hollowed supporting axle and bracket, from and/or to the said elbows on the outside of such bracket in the transverse beam. In this configuration, it can also be seen that fluid from said centre, or the axis of rotation of the solar collector node worm gear and through the centre of its hollowed supporting axle 40 can be routed through different channels within the mechanism and its mechanical components, which may comprise also the said solar collector node worm gear used in this configuration. The fluid is then routed to and/or from the top of the mechanism and therefore solar collector node, where the solar elements may be located, or where further connectors and/or channels may exist which may route the fluid further up, or in other directions, towards and/or from solar elements and respective locations (through perhaps other existing structural members holding such solar elements).

Figure 11:
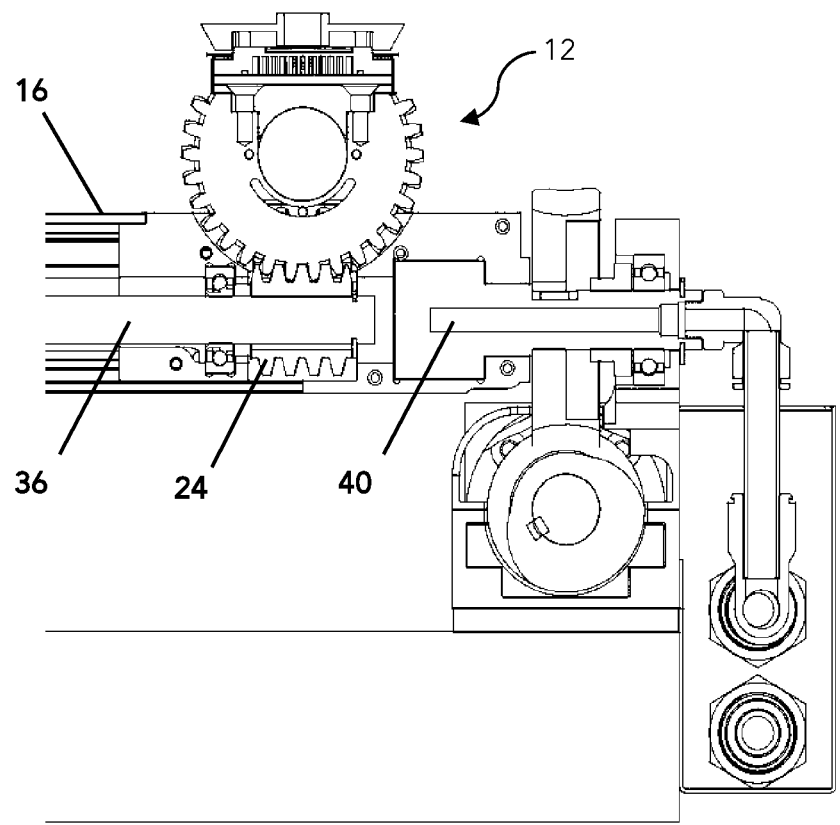
FIG. 11 is a side cross sectional view of a solar collector node with thermal collection system.

FIG. 11 is a side cross sectional view of a solar collector node with a possible configuration for an integrated thermal collection and/or thermal transfer. This figure depicts another view of a cross section, in a different planar direction with respect to the previous figures, showing transverse beam hollow supporting axle 40, which supports fluid flow to the main fluid conduit. As shown, hollow supporting axle 40 in the transverse beam 16 is integrated with collector node mating worm 24, in this configuration, on the rotatable shaft 36 in the transverse beam to enable fluid flow to the solar collector node 12.

Figure 12:
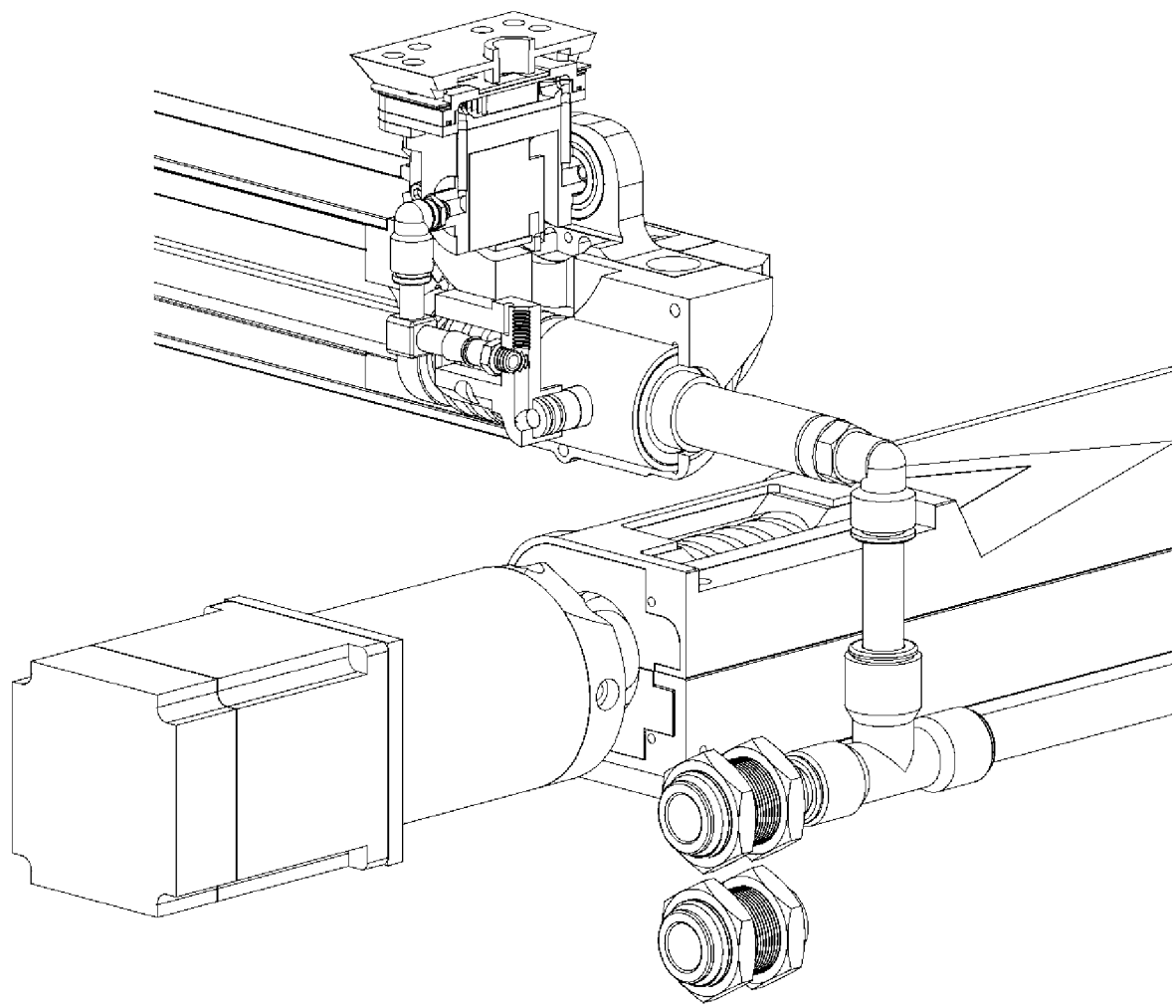
FIG. 12 is a close-up cross sectional view of a single solar collector node with a configuration for an integrated thermal collection and/or thermal transfer and/or management system.

FIG. 12 is a close-up cross sectional view of a single solar collector node with a possible configuration for an integrated thermal collection and/or thermal transfer system.

Figure 13:
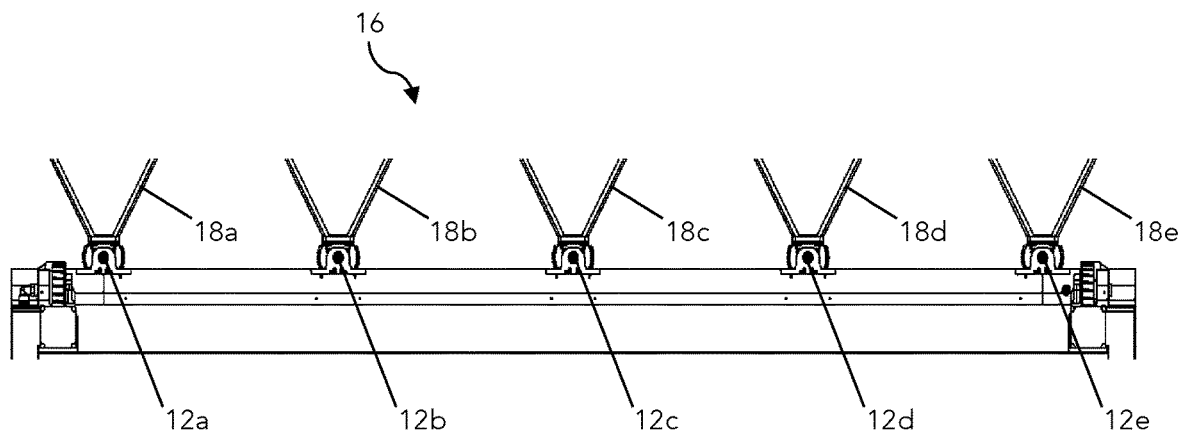
FIG. 13 is a side view of a transverse beam with multiple solar collector nodes attached to a plurality of conical solar collectors.

FIG. 13 is a side view of a transverse beam 16 with multiple solar collector nodes 12a, 12b, 12c, 12d, 12e each attached to, in this embodiment, a plurality of conical solar collectors 18a, 18b, 18c, 18d, 18e. In one embodiment the solar collectors are inverted truncated pyramids with one or more solar elements positioned along the top and/or base of the pyramid. This structure and solar elements are used here as an example of another possible solar element that can be attached to the solar collector nodes and respective supportive structures to enable the solar cells to be pointed towards the sun at all times as actuated by the present dual axis tracker. Utilizing quadrangular, or rectangular shaped solar elements attached directly, or through a supporting structure, to the top of the mechanical motion elements (ex. worm gears) along the different transverse beams, and/or at a desired distance from the top of said elements (ex. mentioned worm gears), will guarantee a minimum spacing between neighbouring solar elements, maximizing area utilization. In the example shown, inverted truncated pyramid based structures can be utilized, connected to the top of said traverse member mechanical elements (ex. worm gears). The height and base side length of an inverted square pyramid can be determined to maximize area utilization, such as the ratio of the sum of the area of the base at the top of said inverted square pyramids over available area, minimizing the distance between neighboring elements to avoid collisions during tracking movement, and shading between neighboring elements. For instance, solar element(s) can be applied at the base (top) of said inverted square pyramids. Additionally, one or more light concentrating lens(es) can be applied with the utilization of one or more solar energy harvesting elements, for instance one or more solar cells or solar panels, at the bottom of the inverted pyramid, closer to its truncated area, i.e., to its virtual apex, and therefore closer to the top of the traverse member mechanical elements (ex. worm drives and gears). Such lenses can be used to concentrate the light directed towards the solar element(s).

Figure 14:
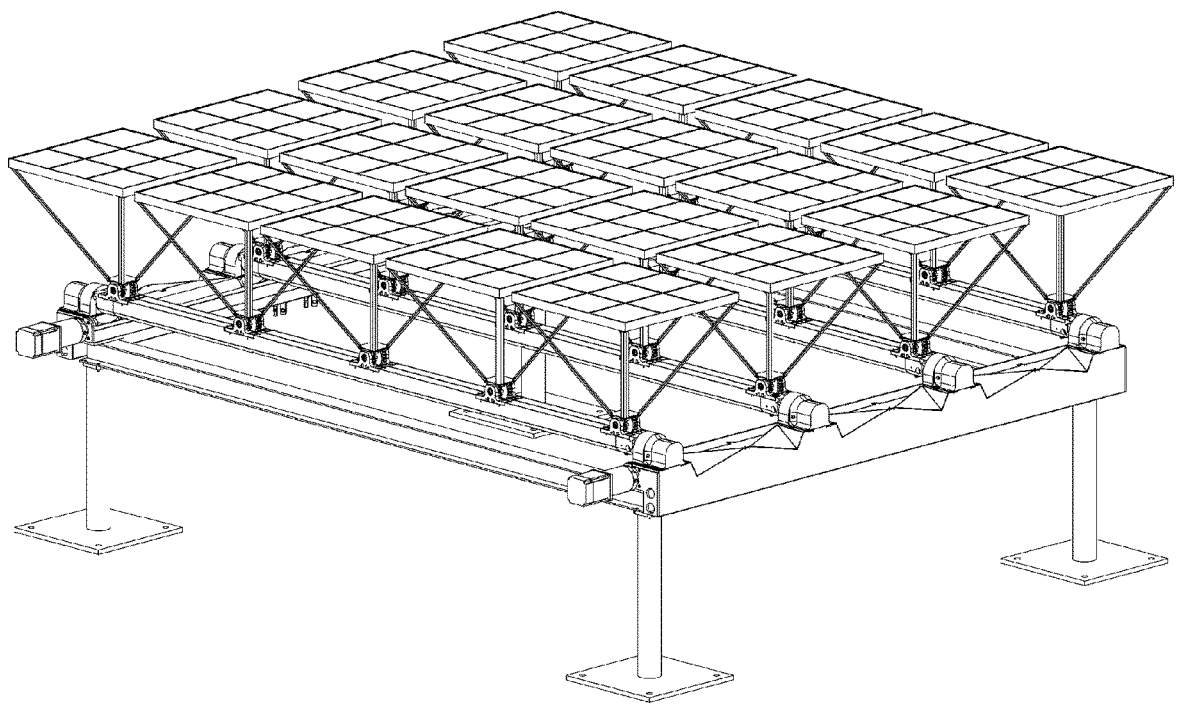
FIG. 14 is an isometric view of a dual axis solar array tracker mounted on a mounting frame.

FIG. 14 is an isometric view of a dual axis solar array tracker with one of the different possible solar elements mounted on an example mounting frame or mounting structure, for instance to avoid shading from surroundings (ex. from another solar harvesting unit, or respective holding structure), or other interference from snow accumulation. For example, the edges or corners of the longitudinal members can be mounted on raising elements, which can be commanded in coordination with the automated control of the tracking system. This added tilting system can thereby tilt the entire tracking system to enable full tracking of the sun for an even more extended period of time. The solar tracker can be mounted also to a structure raised from the mounting area to avoid shading. This may be an added feature when considering the installation of the tracking system, for instance in a horizontal surface or with smaller inclination, prone to snow accumulation. This can also be used in the case of a ground mount, a flat rooftop, or an inclined rooftop with some inclination. Furthermore, the present solar track can be enabled to knock off or remove any snow, or other particles or debris (ex. water, dust, sand, etc.) from the top of the driven solar elements by driving the tracking system of the present invention or with one or more additional motors or vibrators. This can be achieved, for instance, by detecting a lower light level shining on a certain solar element when comparing with light level measured overall on or close to the system, and/or a low level of output energy by such element, and then rotating the solar elements to an inclined position forcing the mentioned snow and/or particles, and/or debris to be removed from the top of, and obstructing solar elements, falling by gravity from the solar elements. This same inclined position can be assumed in conditions with extreme winds. The shown frame has four legs, however it is understood that the mounting frame can adopt other designs, forms, shapes, etc., or also have any number of legs which are optionally telescoping to angle the array relative to the mounting surface. Additionally, the mounting frame can be a single post or pedestal with an optional bearing for adjusting the angle of the solar tracker array relative to the mounting surface, or, for instance based on a scissor (full, half), changing diamond shape, linkages, or other types of mechanism.

Figure 15:
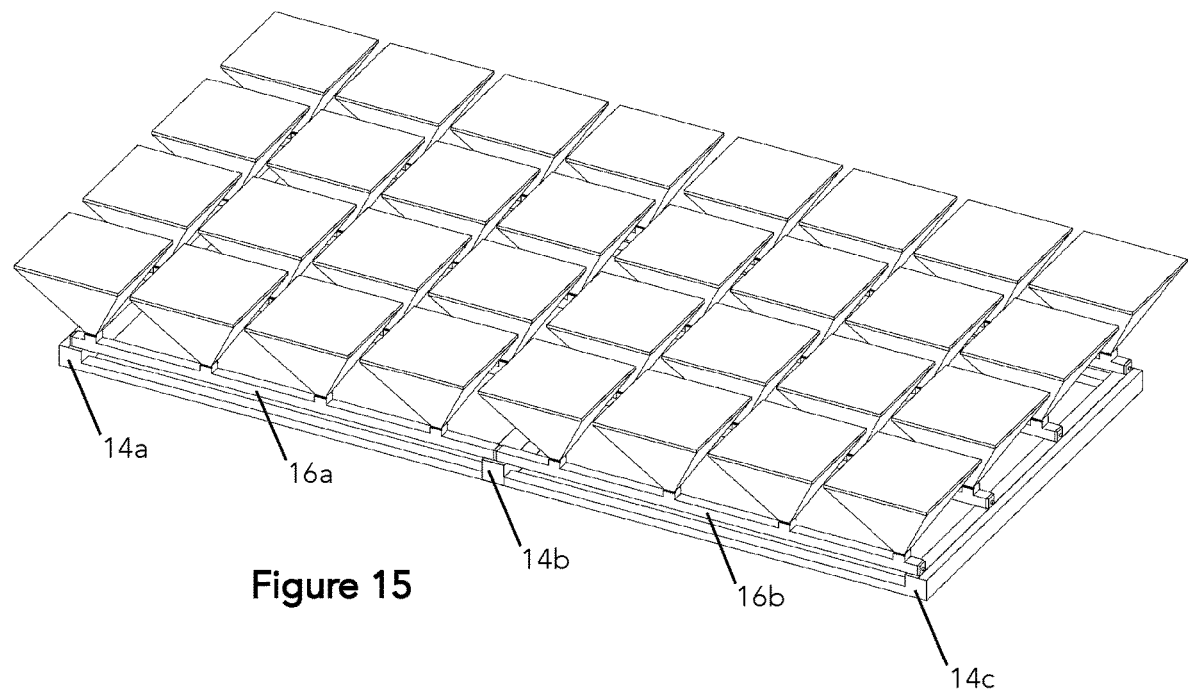
FIG. 15 is an isometric view of a solar tracker array having a central longitudinal beam.

FIG. 15 is an isometric view of a solar tracker array having a central longitudinal beam 14*b* and two peripheral longitudinal beams 14*a*, 14*c*. Transverse beams extend between the central longitudinal beam 14*b* and one of the peripheral longitudinal beams 14*a* or 14*c*. As shown, transverse beam 16*a* extends between central longitudinal beam 14*b* and peripheral longitudinal beam 14*a*, and transverse beam 16*b* extends between central longitudinal beam 14*b* and peripheral longitudinal beam 14*c*. The central longitudinal beam 14*b* can have either the mechanical system that operates to rotate the transverse beams or the mechanical system that operates to tilt the solar collector nodes in each transverse beam, and the transverse beams can be operated on both sides of the central longitudinal beam 14*b*. Peripheral longitudinal beams 14*a* or 14*c* can have a mechanical system that performs the other function, i.e. if the central longitudinal beam is responsible for rotation, then the longitudinal beams are responsible for tilt, or vice versa. In this way a single central longitudinal beam can control two sets of transverse beams on either side of it with a single motor.

Figure 16:
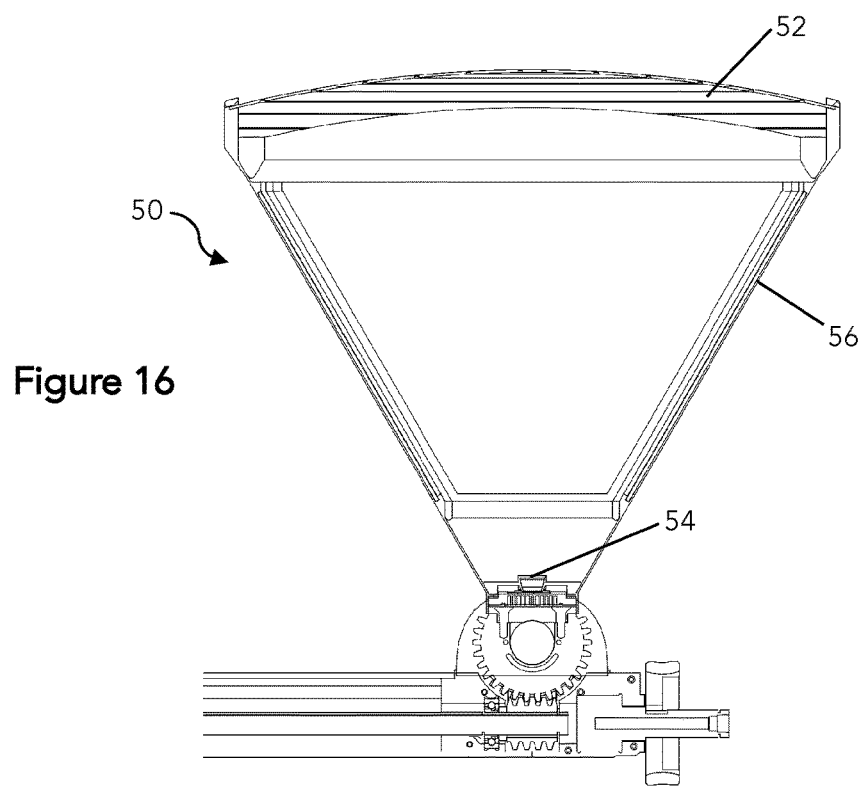
FIG. 16 is a side cross-sectional view of a solar concentrator.

FIG. 16 is a side cross-sectional view of a solar concentrator which can be used as a solar collector with the presently described solar array tracker. The solar concentrator 50 comprises a concentrator body 56 which may have approximately an inverted pyramidal structural shape that provides support to the solar concentrator. An optical element 52 is positioned at the upper or wide end of the concentrator body 56 to concentrate and/or focus the light source rays within the solar concentrator and onto at least one solar cell 54. The optical element can be, for example, a Fresnel lens, although other different or additional optical elements, such as a concave lens, mirror, or other light-directing optical elements may also be used in the solar concentrator. The optical element 52 above the narrow end of the concentrator body 56 preferably encases the upper opening of the solar concentrator 50. It may also be recessed within the upper opening of the concentrator body 56. The concentrator body may consist of different walls at its sides. The inner walls of the concentrator body 56 may also be made of, or coated with, a highly reflective, mirror-like material to further assist with concentration of incoming light onto the solar cell 54. The outer walls may consist of, be coated with, have a a structure to incorporate, or have added one or more of possible different types of solar collection components, considering one of, or both, electrical and thermal conversion.

At the narrow end of the solar concentrator is at least one solar cell 54 which receives the concentrated or focused light rays collected by the optical element 52. The solar cell can be, for example, a photovoltaic (PV) cell to collect light energy, a thermal collection cell to collect thermal energy, or a combined photo-thermal collection cell such that both light, possibly converted to electrical energy, and thermal energy can be collected from the incoming solar rays. In one embodiment, the collector node which attaches the solar collector to a solar array tracker can further comprise a mechanism to move the solar collector into or away from the concentrated light path. In particular, the solar cell positioned on top of the solar collector node could be configured such that it can be moved using a mechanical system which may include one or more motors to change the position of the cell to move the solar cell 54 toward or away from the light focal point of the solar collector, which is provided by the optical element 52, or to move the focal point relative to the solar cell 54. In this way the system can be capable of selecting whether the incoming light energy is used to generate electricity through a PV cell or heat through a heat sink, or a combination of both. One benefit of using a solar collector is that the size of the solar cell can be smaller due to the effect of light concentration from the optical element. This enables the thermal collection system to also be smaller and more efficient than what could be achieved with larger thermal collection cells receiving lower intensity light/heat energy, providing simplicity to the thermal fluid conduction system.

The presently described solar tracker array is adaptable for applications from large-scale arrays used for grid-connected applications to small-size residential applications. For residential installations, the collector can also be designed as a roof-top solar panel array, where one tracker is made up of adjacent solar energy harvesting elements. Elevated and/or angled versions of the presently described tracker can be erected at a sufficient height above ground which will also allow for the full use of the land beneath for agricultural and other purposes, which minimizes the overall footprint.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. A solar array tracker comprising:
   a first longitudinal beam comprising a first mechanical system;
   a second longitudinal beam offset from the first longitudinal beam comprising a second mechanical system; and
   at least one rotatable transverse beam extending between the first longitudinal beam and the second longitudinal beam, the transverse beam comprising:
   a rotatable shaft inside the transverse beam;
   a plurality of solar collector nodes each comprising a collector node mechanical element and connected to a thermal collection cell;

a first end comprising a first transverse beam mechanical element for engaging with the first mechanical system to effect rotation of the transverse beam around its axis;

a second end comprising a second transverse beam mechanical element operatively engaged with the rotatable shaft for engaging with the second mechanical system to tilt the plurality of solar collector nodes relative to the transverse beam through the collector node mechanical element in each of the plurality of solar collector nodes by rotating the rotatable shaft inside the transverse beam; and a thermal conduit connecting each of the plurality of solar collector nodes.

2. The solar array tracker of claim 1, wherein each of the plurality of solar collector nodes are connected to a photovoltaic cell.

3. The solar array tracker of claim 1, wherein the plurality of solar collector nodes are connected to one or more mirror, lens, light concentration element, and light-directing optical.

4. The solar array tracker of claim 1, wherein the rotatable transverse beam further comprises an electrical conduit.

5. The solar array tracker of claim 1, wherein the thermal conduit is in a hollow cross section of the transverse beam.

6. The solar array tracker of claim 1, wherein the first longitudinal beam, the second longitudinal beam, or the first longitudinal beam and the second longitudinal beam comprise a longitudinal fluid conduit connecting to the thermal conduit in the transverse beam.

7. The solar array tracker of claim 1, wherein the thermal conduit in the transverse beam fluidly connects the plurality of solar collector nodes to a thermal energy capture system.

8. The solar array tracker of claim 1, further comprising a first motor connected to the first mechanical system for controlling the first mechanical system and a second motor connected to the second mechanical system for controlling the second mechanical system.

9. The solar array tracker of claim 1, wherein the thermal collection cell is a combined photo-thermal collection cell.

10. The solar array tracker of claim 1, wherein each of the plurality of solar collector nodes comprise a collector node fluid conduit fluidly connected to the thermal conduit.

11. The solar array tracker of claim 1, wherein at least one of the first longitudinal beam and the second longitudinal beam comprises a longitudinal electrical main, and the plurality of solar collector nodes are electrically connected to the longitudinal electrical main.

12. The solar array tracker of claim 1, wherein the thermal conduit in the transverse beam is fluidly connected to a fluid conduit main.

13. The solar array tracker of claim 1, wherein the first mechanical system comprises a worm drive.

14. The solar array tracker of claim 13, wherein the first end of the rotatable transverse beam comprises a first transverse beam gear for engaging with the worm drive in the first mechanical system.

15. The solar array tracker of claim 14, wherein the first transverse beam gear is a worm gear.

16. The solar array tracker of claim 1, further comprising a plurality of transverse beams.

17. The solar array tracker of claim 1, further comprising a mounting structure for raising the solar tracker relative to a mounting surface.

18. The solar array tracker of claim 17, wherein the mounting structure is capable of adjusting an angle of the solar tracker array relative to the mounting surface.

19. The solar array tracker of claim 1, wherein the solar array tracker is a solar cogeneration system.

20. The solar array tracker of claim 1, wherein the thermal conduit acts as a heat sink or cooling system to the plurality of solar collector nodes.

* * * * *